United States Patent
Masuda et al.

(10) Patent No.: US 10,719,703 B2
(45) Date of Patent: Jul. 21, 2020

(54) NON-TRANSITORY COMPUTER-READABLE STORAGE MEDIUM FOR STORING LINE-OF-SIGHT ANALYSIS PROGRAM, LINE-OF-SIGHT ANALYSIS METHOD, AND LINE-OF-SIGHT ANALYSIS APPARATUS

(71) Applicant: FUJITSU LIMITED, Kawasaki-shi, Kanagawa (JP)

(72) Inventors: Yuta Masuda, Kawasaki (JP); Takuya Kamimura, Kobe (JP); Takeshi Otani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 133 days.

(21) Appl. No.: 15/985,796

(22) Filed: May 22, 2018

(65) Prior Publication Data
US 2018/0349696 A1  Dec. 6, 2018

(30) Foreign Application Priority Data

May 30, 2017 (JP) .................................. 2017-106566
Jan. 19, 2018 (JP) .................................. 2018-007459

(51) Int. Cl.
| | | |
|---|---|---|
| G06K 9/00 | (2006.01) | |
| G06Q 30/06 | (2012.01) | |
| G06T 7/10 | (2017.01) | |
| G06F 3/01 | (2006.01) | |
| G06K 9/20 | (2006.01) | |

(52) U.S. Cl.
CPC ......... *G06K 9/00597* (2013.01); *G06F 3/013* (2013.01); *G06K 9/00248* (2013.01); *G06Q 30/06* (2013.01); *G06T 7/10* (2017.01); *G06K 9/2018* (2013.01)

(58) Field of Classification Search
CPC ......... G06T 19/006; G06T 7/70; G06T 19/20; G06T 15/20; G06T 13/40; G06T 19/00; G06T 19/003; G06T 2200/04; G06T 7/73; G06T 11/005; G06T 2207/10028; G06T 2207/30196; G06T 2207/30201; G06T 2207/30232; G06T 2207/30241; G06T 2207/30261; G06T 2219/2016; G06T 7/20
USPC ....................................................... 382/103
See application file for complete search history.

(56) References Cited

U.S. PATENT DOCUMENTS

2015/0212720 A1* 7/2015 Ogishi .................. G06F 3/0483
715/857
2016/0055330 A1* 2/2016 Morishita ............... G06F 1/163
726/19

FOREIGN PATENT DOCUMENTS

| | | |
|---|---|---|
| JP | 2009-42956 | 2/2009 |
| JP | 2015-52879 | 3/2015 |

* cited by examiner

*Primary Examiner* — Ajibola A Akinyemi
(74) *Attorney, Agent, or Firm* — Staas & Halsey LLP

(57) ABSTRACT

A line-of-sight analysis method, performed by a computer, includes: identifying, when a selection event with respect to a first object out of a plurality of objects is detected, a second object different from the first object, based on a detection status of line-of-sight relative to the objects in a most recent time period of the selection event; and outputting information indicating the identified second object.

12 Claims, 28 Drawing Sheets

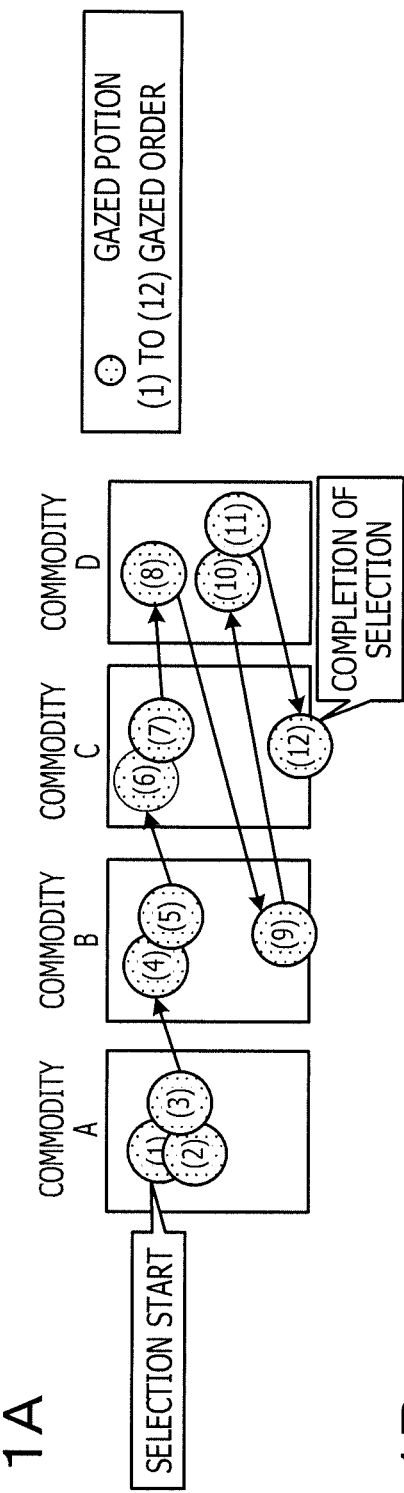
FIG. 1A
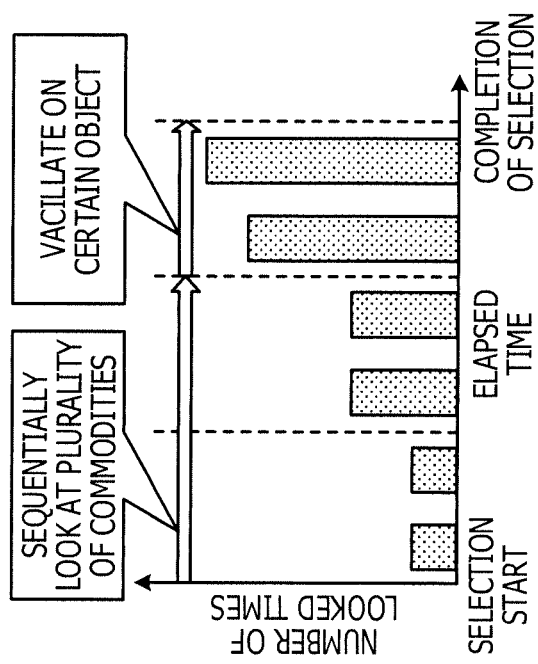
FIG. 1C
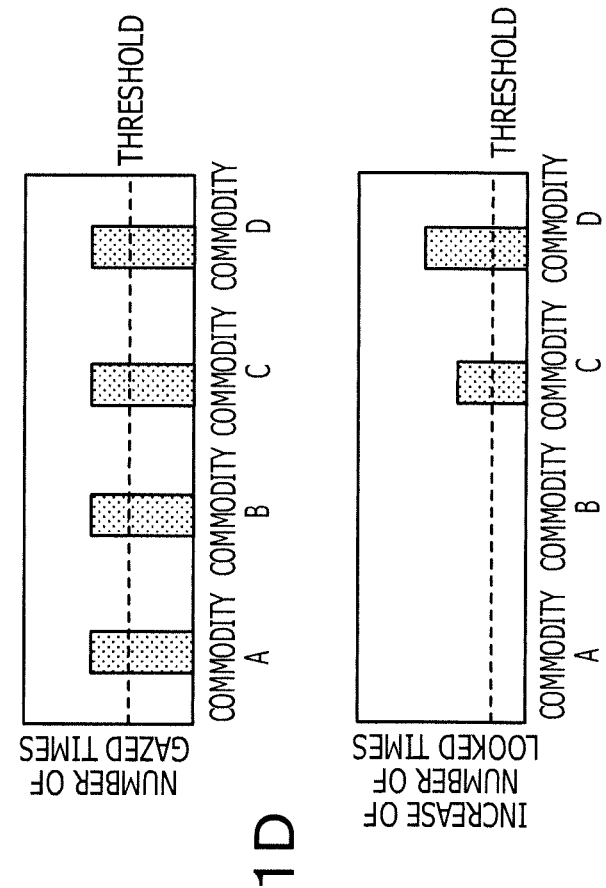
FIG. 1B
FIG. 1D (a)

| RECORD TIME (DATE-HOUR/MINUTE/SECOND-MILISECOND) | LINE-OF-SIGHT DATA x (pixel) | LINE-OF-SIGHT DATA y (pixel) |
|---|---|---|
| 20160728-134024-489 | 1200 | 168 |
| 20160728-134024-620 | 1225 | 243 |
| 20160728-134024-751 | 1220 | 209 |
| 20160728-134024-883 | 1190 | 207 |
| 20160728-134025-014 | 1205 | 208 |
| 20160728-134025-171 | 1200 | 229 |
| 20160728-134025-278 | 1210 | 366 |
| 20160728-134025-344 | 493 | 204 |
| 20160728-134025-475 | 455 | 167 |
| 20160728-134025-607 | 437 | 153 |
| 20160728-134025-749 | 454 | 197 |
| 20160728-134025-870 | 350 | 220 |
| 20160728-134026-001 | 339 | 165 |
| 20160728-134026-145 | 252 | 140 |
| 20160728-134026-265 | 315 | 195 |
| 20160728-134026-395 | 264 | 143 |
| 20160728-134026-527 | 263 | 147 |
| 20160728-134026-659 | 254 | 123 |
| 20160728-134026-790 | 260 | 135 |

(b) LINE-OF-SIGHT DATA a (t,x,y)

(c)

| RECORD TIME (DATE-HOUR/MINUTE/SECOND-MILISECOND) | LINE-OF-SIGHT DATA x (pixel) | LINE-OF-SIGHT DATA y (pixel) | LOOKED COMMODITY |
|---|---|---|---|
| 20160728-134024-489 | 1200 | 168 | B |
| 20160728-134024-620 | 1225 | 243 | B |
| 20160728-134024-751 | 1220 | 209 | B |
| 20160728-134024-883 | 1190 | 207 | B |
| 20160728-134025-014 | 1205 | 208 | B |
| 20160728-134025-171 | 1200 | 229 | B |
| 20160728-134025-278 | 1210 | 366 | B |
| 20160728-134025-344 | 493 | 204 | A |
| 20160728-134025-475 | 455 | 167 | A |
| 20160728-134025-607 | 437 | 153 | A |
| 20160728-134025-749 | 454 | 197 | A |
| 20160728-134025-870 | 350 | 220 | A |
| 20160728-134026-001 | 339 | 165 | A |
| 20160728-134026-145 | 252 | 140 | A |
| 20160728-134026-265 | 315 | 195 | A |
| 20160728-134026-395 | 264 | 143 | A |
| 20160728-134026-527 | 263 | 147 | A |
| 20160728-134026-659 | 254 | 123 | A |
| 20160728-134026-790 | 260 | 135 | A |

FIG. 6

| ELAPSED TIME | NUMBER OF LOOKED TIMES OF COMMODITY | | | |
|---|---|---|---|---|
| | COMMODITY A | COMMODITY B | COMMODITY C | COMMODITY D |
| START TO T/3 | 3 | 1 | 0 | 0 |
| T/3 TO 2T/3 | 0 | 1 | 2 | 1 |
| 2T/3 TO COMPLETION | 0 | 1 | 1 | 2 |

| NUMBER OF COMMODITIES | THRESHOLD |
|---|---|
| 2 | $S_{th2}$ |
| 3 | $S_{th3}$ |
| 4 | $S_{th4}$ |
| 5 | $S_{th5}$ |

FIG. 10

| ELAPSED TIME | WEIGHT COEFFICIENT | NUMBER OF LOOKED TIMES OF COMMODITY A $n$ | VALUE P IN WHICH NUMBER OF LOOKED TIMES IS MULTIPLIED BY WEIGHT $p$ |
| --- | --- | --- | --- |
| START TO T/3 | $\alpha$ | nA1 | pA1 = $\alpha \times$ (nA1) |
| T/3 TO 2T/3 | $\beta$ | nA2 | pA2 = $\beta \times$ (nA2) |
| 2T/3 TO COMPLETION | $\gamma$ | nA3 | pA3 = $\gamma \times$ (nA3) |

FIG. 15

| TIME ELAPSE (FOR EVERY UNIT TIME) | NUMBER OF LOOKED TIMES n OF EACH COMMODITY ||||||||||
|---|---|---|---|---|---|---|---|---|---|
| | NUMBER OF LOOKED TIMES OF COMMODITY nA | NUMBER OF LOOKED TIMES OF COMMODITY nB | NUMBER OF LOOKED TIMES OF COMMODITY nC | NUMBER OF LOOKED TIMES OF COMMODITY nD | NUMBER OF LOOKED TIMES OF COMMODITY nE | NUMBER OF LOOKED TIMES OF COMMODITY nF | NUMBER OF LOOKED TIMES OF COMMODITY nG | NUMBER OF LOOKED TIMES OF COMMODITY nH | NUMBER OF LOOKED TIMES OF COMMODITY nI |
| t-4 | 6 | 6 | 6 | 3 | 3 | 3 | 3 | 3 | 3 |
| t-3 | 0 | 1 | 5 | 5 | 5 | 7 | 7 | 7 | 0 |
| t-2 | 0 | 0 | 0 | 2 | 9 | 9 | 9 | 9 | 0 |
| t-1 | 0 | 0 | 0 | 0 | 9 | 9 | 1 | 1 | 0 |
| t | 0 | 0 | 0 | 0 | 0 | 10 | 0 | 0 | 0 |
| t+1 | 0 | 0 | 0 | 0 | 0 | 10 | 0 | 0 | 0 |

FIG. 16A

| TIME ELAPSE (FOR EACH UNIT TIME) | NUMBER OF COMMODITIES m WITH MORE NUMBER OF LOOKED TIMES |
|---|---|
| t-4 | 9 |
| t-3 | 6 |
| t-2 | 4 |
| t-1 | 2 |
| t | 2 |
| t+1 | 1 |

FIG. 16B

| TIME ELAPSE (FOR EACH UNIT TIME) | DECREASED AMOUNT OF m | DETERMINATION OF VACILLATION STATE |
|---|---|---|
| t-4 | - | SELECTION START |
| t-3 | 3 | NOT VACILLATION |
| t-2 | 2 | NOT VACILLATION |
| t-1 | 2 | NOT VACILLATION |
| t | 0 | VACILLATION |
| t+1 | 1 | SELECTION COMPLETION |

| OBJECT | ARRANGEMENT | | COMMODITY LEFT-UPPER COORDINATES | | COMMODITY RIGHT-LOWER COORDINATES | |
|---|---|---|---|---|---|---|
| | ROW | STAGE | x COORDINATE (pixel) | y COORDINATE (pixel) | x COORDINATE (pixel) | y COORDINATE (pixel) |
| A | 1 | 1 | 0 | 0 | 200 | 200 |
| B | 2 | 1 | 200 | 0 | 400 | 200 |
| C | 3 | 1 | 400 | 0 | 600 | 200 |
| D | 1 | 2 | 0 | 200 | 200 | 400 |
| E | 2 | 2 | 200 | 200 | 400 | 400 |
| F | 3 | 2 | 400 | 200 | 600 | 400 |

OBJECT ARRANGEMENT EXAMPLE

| A | B | C |
|---|---|---|
| D | E | F |

FIG. 19

| CLIENT ID | PURCHASED COMMODITY | VACILLATED COMMODITY | |
|---|---|---|---|
| 1 | B | D | - |
| 2 | C | E | - |
| 3 | F | C | A |
| 4 | A | C | - |
| 5 | C | A | F |
| 6 | B | 0 | - |

| NUMBER OF COMMODITIES | THRESHOLD |
|---|---|
| 2 | $S_{th2}$ |
| 3 | $S_{th3}$ |
| 4 | $S_{th4}$ |
| 5 | $S_{th5}$ |

HIGH ⇅ LOW

| TIME | TIME FROM START (SECONDS) |
|---|---|
| T1 | 0 TO 5 |
| T2 | 5 TO 10 |
| T3 | 10 TO 15 |
| T4 | 15 TO 20 |
| T5 | 20 TO 25 |

NON-TRANSITORY COMPUTER-READABLE STORAGE MEDIUM FOR STORING LINE-OF-SIGHT ANALYSIS PROGRAM, LINE-OF-SIGHT ANALYSIS METHOD, AND LINE-OF-SIGHT ANALYSIS APPARATUS

CROSS-REFERENCE TO RELATED APPLICATIONS

This application is based upon and claims the benefit of priority of the prior Japanese Patent Application No. 2018-007459, filed on Jan. 19, 2018, and the prior Japanese Patent Application No. 2017-106566, filed on May 30, 2017, the entire contents of which are incorporated herein by reference.

FIELD

The embodiments discussed herein are related to a non-transitory computer-readable storage medium for storing a line-of-sight analysis program, a line-of-sight analysis method, and a line-of-sight analysis apparatus.

BACKGROUND

Proposed is a technology in which the number of times that a user gazes at a commodity from a start to an end of a buying behavior by the user is counted, and a commodity the number of times for which is not less than a given number of times is estimated as a gazed commodity. Herein, it is determined that the user has certain interests in all the commodities the number of gazed times for which is not less than the given number of times, or vacillates whether to purchase the commodities.

Examples of the related art include Japanese Laid-open Patent Publication No. 2009-42956.

SUMMARY

According to an aspect of the invention, a line-of-sight analysis method, performed by a computer, includes: identifying, when a selection event with respect to a first object out of a plurality of objects is detected, a second object different from the first object, based on a detection status of line-of-sight relative to the objects in a most recent time period of the selection event; and outputting information indicating the identified second object.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 1A to 1D are diagrams for explaining a relation between a line-of-sight and a selection of a commodity;

FIG. 6 is a diagram for explaining the line-of-sight analysis processing according to the first embodiment;

FIG. 10 is a diagram for explaining the line-of-sight analysis processing according to the third embodiment;

FIG. 15 is another diagram for explaining the line-of-sight analysis processing according to the fifth embodiment;

FIGS. 16A and 16B are still another diagrams for explaining the line-of-sight analysis processing according to the fifth embodiment;

FIG. 19 is a diagram illustrating one example of a vacillated object DB according to the one embodiment;

DESCRIPTION OF EMBODIMENTS

Figure 2:
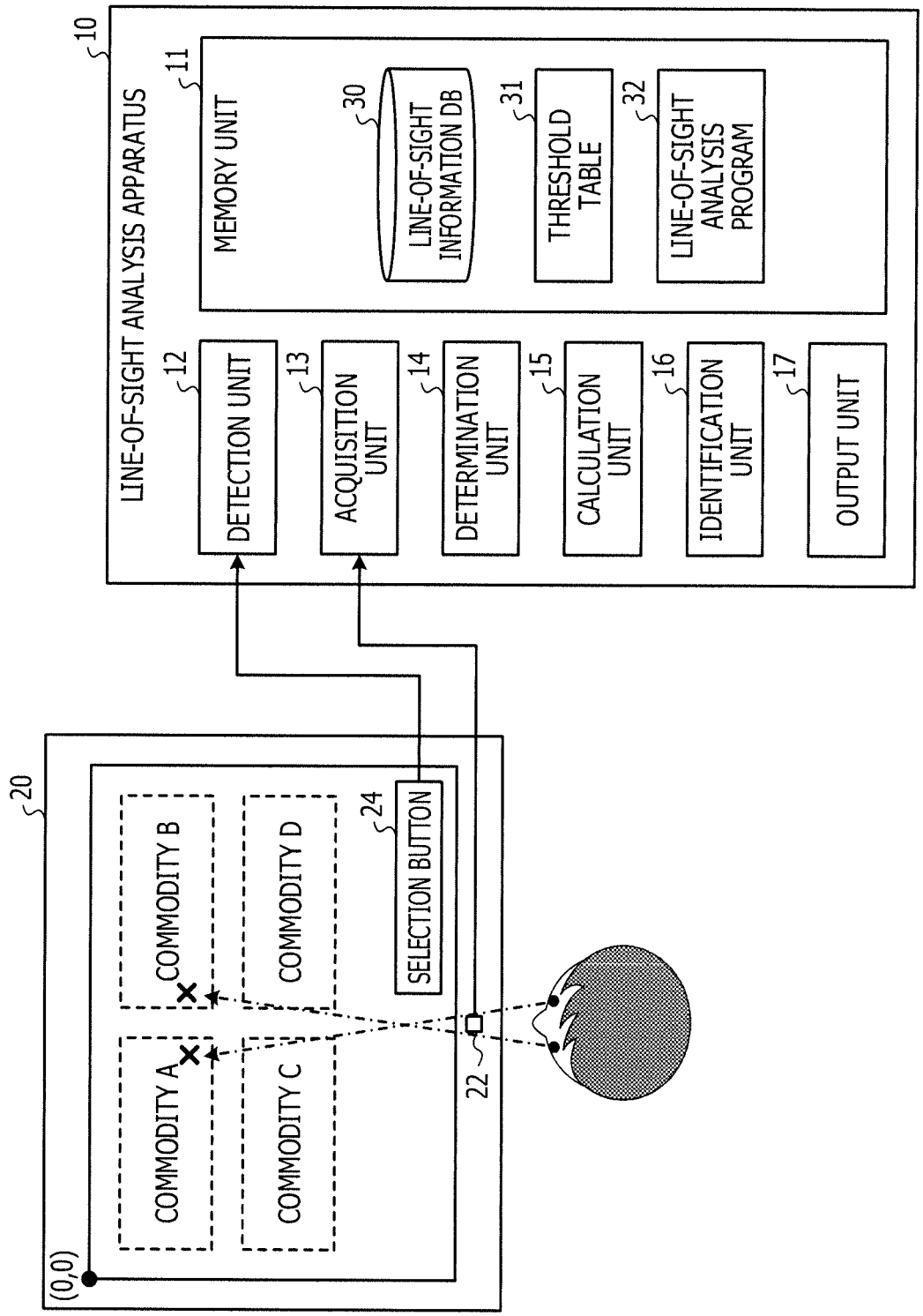
FIG. 2 is a diagram illustrating one example of a function configuration of a line-of-sight analysis apparatus according to first to fifth embodiments.

The abovementioned related art does not consider such a case that meaning of gazing at a commodity by a user may vary depending on the timing when the user gazes at the commodity between a start of a selection of the commodity and a completion thereof. Accordingly, there is a problem in that an object for which the user does not vacillate on the selection is erroneously determined as an object for which the user vacillate.

According to an aspect of the embodiments discussed herein, provided are technologies for improving an accuracy to estimate an object in which a user is interested based on line-of-sight information on the user.

Hereinafter, embodiments discussed herein are described with reference to the drawings. Noted that in the description and the drawings, the same reference numerals are given to the components having substantially the same functions, and overlapped explanations are thus omitted.

"Gaze" indicates that the line-of-sight is stayed in a predetermined flat region during a predetermined time or more. A gazed commodity may be considered as a commodity in which a user has certain interests or the commodity for which the user vacillates on the purchase or the selection, so that correct estimation of a gazed commodity may be used for a sales promotion and the like of the commodity.

For example, as illustrated in FIG. 1A, when the number of times and the order in which a user gazes at any one of commodities A to D between a selection start and a selection completion of a commodity are counted, and a commodity in which the number of gaze times is not less than a threshold is estimated as a gazed commodity, all the commodities A to D illustrated in FIG. 1B are estimated as gazed commodities.

However, as illustrated in FIG. 1C, a person sends a line-of-sight in such a manner that he/she sequentially looks at a plurality of commodities, then narrows down the commodities that he/she desires to buy, and vacillates on which one of the narrowed down commodities is purchased. In other words, the user looks at a vacillated object at the time close to the selection completion with high frequency. Therefore, when the commodities in which the number of gaze times is not less than a threshold are equally estimated as gazed commodities, an object for which the user does not vacillate to buy is erroneously determined as an object for which the user has vacillated.

Therefore, an line-of-sight analysis apparatus according to the embodiments discussed herein estimates, based on an increased amount for the number of times that the user looks at an object with the elapse of time, whether the object is a commodity for which the user has vacillated on the purchase or the selection as illustrated in FIG. 1D, and outputs the commodity estimated as a commodity for which the user has vacillated. In this manner, correct estimation of an object for which the user has vacillated on the purchase or the selection based on line-of-sight data may be utilized in the field of marketing such as the sales promotion based on information on the gazed (vacillated) commodity that is an unpurchased commodity. Details of the line-of-sight analysis apparatus according to the embodiments discussed herein are described below.

[Function Configuration of Line-of-Sight Analysis Apparatus]

Firstly, one example of a function configuration of a line-of-sight analysis apparatus 10 according to one embodiment of the disclosure is described with reference to FIG. 2. FIG. 2 illustrates one example of a function configuration of the line-of-sight analysis apparatus 10 according to first to fifth embodiments. The line-of-sight analysis apparatus 10 acquires information related to a plurality of commodities (herein, the commodities A to D) drawn on a screen of a digital signage 20 and a line-of-sight that is turned to a plurality of commodities displayed in a shop, using a line-of-sight sensor 22 attached to the digital signage 20 and the like. The line-of-sight analysis apparatus 10 estimates, in a scene where a user looks at and selects a commodity in the digital signage 20 or a display showcase, a "vacillated commodity" using acquired line-of-sight data.

The line-of-sight sensor 22 is arranged in front of each shelf in the shop or at a position opposed to a person who looks at the digital signage 20, and measures a motion of a line-of-sight of the person. One example of the line-of-sight sensor 22 includes a line-of-sight detection camera, however, the line-of-sight sensor 22 is not limited thereto. For example, as one example being indicated in Japanese Laid-open Patent Publication No. 2015-192343, it is possible to acquire a motion of a line-of-sight using a publicly known line-of-sight sensor. Moreover, one line-of-sight sensors 22 is provided in the present embodiment, however, is not limited thereto, and one or a plurality of line-of-sight sensors 22 may be provided in the digital signage 20 or in the shop.

Examples to the line-of-sight detection using a line-of-sight detection camera may include a method of using a positional relationship by setting the reference point to the corners of someone's eyes and the moving point to irises thereof, and a method of using a positional relationship by setting the reference point to corneal reflex and the moving point to pupils. In the method of using a positional relationship by setting the reference point to the corners of someone's eyes and the moving point to irises thereof, a motion of the user is photographed by a camera that photographs visible light as a line-of-sight detection camera. In the method of using a positional relationship by setting the reference point to corneal reflex and the moving point to pupils, an infrared ray LED irradiates a face of a user, and an infrared ray camera photographs eyes of the user. The line-of-sight analysis apparatus 10 performs image processing of an image of the eyes of the user having been photographed that is transmitted from the line-of-sight sensor 22, detects the motion of the eyes, and analyzes a position at which the user looks (plane coordinates).

The line-of-sight analysis apparatus 10 includes a memory unit 11, a detection unit 12, an acquisition unit 13, a determination unit 14, a calculation unit 15, an identification unit 16, and an output unit 17. The memory unit 11 stores therein programs and data including a line-of-sight information DB 30, a threshold table 31, and a line-of-sight analysis program 32.

Figure 3:
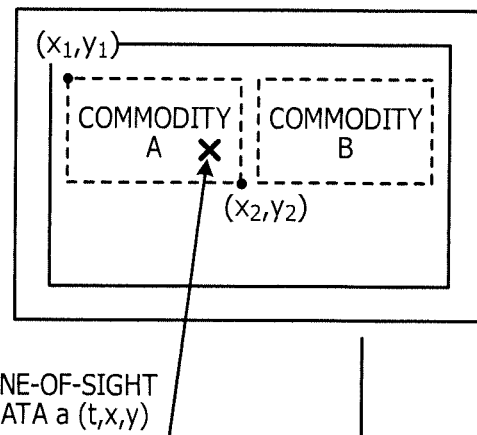
FIG. 3 is a diagram illustrating one example of a line-of-sight information DB and a commodity determination result according to one embodiment.

(a) of FIG. 3 illustrates one example of the line-of-sight information DB 30. The line-of-sight information DB 30 stores therein line-of-sight data when a user turns his/her line-of-sight to a commodity displayed on the digital signage 20 or a commodity displayed in the shop, in other words, coordinates (x, y) of the line-of-sight, in association with a record time. For example, line-of-sight data may be recorded in about one second 10 times. The line-of-sight data may be in units of pixels or mm units of the digital signage 20.

The threshold table 31 stores therein thresholds each of which is used for determining whether the user gazes at a commodity using the line-of-sight data.

Referring back to FIG. 2, the detection unit 12 detects a selection event with respect to a certain object (hereinafter, referred to as "first object") out of a plurality of objects. One example of the detection of a selection event with respect to the first object may include detecting that any one of the commodities A to D displayed on the digital signage 20 is selected, and a selection button 24 is pressed down. Another example of the detection of a selection event with respect to the first object may include detecting that a user when purchasing a commodity displayed in the shop is registered in a point of sales system (POS) system.

The line-of-sight analysis program 32 is a program for identifying a second object different from the first object as a vacillated commodity, when a selection event is detected, based on a detection status of line-of-sight for a plurality of objects, in the most recent time period of the selection event. The first object and the second object may include a commodity present in a real space, a display of a commodity in a virtual space, a display of a thumbnail image of a commodity, a partial enlargement display of a commodity, a display of a characteristic portion of a commodity, and the like.

Noted that the "vacillated commodity" described below may be a commodity that a user selects or purchases after having vacillated on the selection or the purchase, or may be a commodity that the user neither selects nor purchases after having vacillated on the selection or the purchase.

The acquisition unit 13 acquires an image including a state of line-of-sight of a user from the line-of-sight sensor 22. The determination unit 14 analyzes the acquired image, extracts coordinates for which a line-of-sight of the user is headed, and determines a commodity at which the user has looked from a region in which coordinates of the line-of-sight is included. For example, as illustrated in (b) of FIG. 3, a region of the commodity A defined by left-upper coordinates (X1, Y1) and right-lower coordinates (X2, Y2). The determination unit 14 determines, from region information defined for each commodity in this manner and coordinates (t, x, y) of the line-of-sight data at a time t stored in the line-of-sight information DB 30, a commodity at which the user looks at the time t, and stores the commodity in the line-of-sight information DB 30. (c) of FIG. 3 illustrates one example in which a commodity determined that the user has looked is stored in a column of the "looked commodity" of the line-of-sight information DB 30.

The calculation unit 15 calculates the number of times in which the user looks at each commodity for each predetermined time, and calculates an increased amount for the number of times that the user looks at the object with the elapse of time. The identification unit 16 identifies a commodity for which the user has vacillated on the purchase or the selection based on the calculated increased amount. The output unit 17 outputs the identified vacillated commodity.

[Hardware Configuration of Line-of-Sight Analysis Apparatus]

Figure 4:
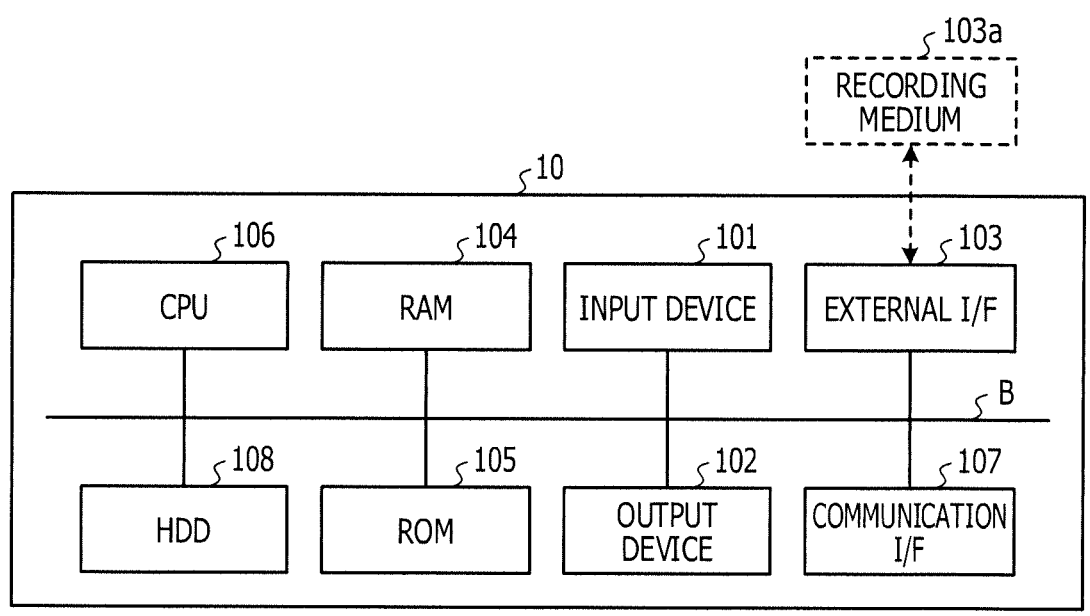
FIG. 4 is a diagram illustrating one example of a hardware configuration of a line-of-sight analysis apparatus according to the one embodiment.

Next, one example of a hardware configuration of the line-of-sight analysis apparatus 10 according to the embodiments discussed herein is described with reference to FIG. 4. FIG. 4 is a diagram illustrating one example of a hardware configuration of the line-of-sight analysis apparatus 10 according to the one embodiment.

The line-of-sight analysis apparatus 10 includes an input device 101, an output device 102, an external I/F 103, a random access memory (RAM) 104, a read only memory (ROM) 105, a central processing unit (CPU) 106, a communication I/F 107, and a hard disk drive (HDD) 108. The respective units of the line-of-sight analysis apparatus 10 are mutually coupled with a bus B.

The input device 101 includes a key board, a mouse and the like, and is used for inputting respective operation signals into the line-of-sight analysis apparatus 10. The output device 102 includes a display such as a liquid crystal display (LCD) monitor or a digital signage, a printer, a cathode ray tube (CRT), and the like, and outputs various kinds of process results. The communication I/F 107 is an interface that couples the line-of-sight analysis apparatus 10 to a network. This enables the line-of-sight analysis apparatus 10 to perform data communication with equipment such as a server or the like on a cloud via the communication I/F 107.

The HDD 108 is a nonvolatile storage device that stores therein a program and data. The program and data to be stored include basic software that entirely controls the line-of-sight analysis apparatus 10, and application software. For example, the HDD 108 may store therein various kinds of databases, the line-of-sight analysis program 32, and the like.

The external I/F 103 is an interface with an external device. The external device includes a recording medium 103a and the like. This enables the line-of-sight analysis apparatus 10 to perform reading and/or writing of the recording medium 103a via the external I/F 103. The recording medium 103a includes a compact disk (CD), a digital versatile disk (DVD), an SD memory card, a Universal Serial Bus (USB memory) memory, and the like.

The ROM 105 is a nonvolatile semiconductor memory that may hold internal data after the power supply is turned off. The ROM 105 stores therein a program and data of network setting or the like. The RAM 104 is a volatile semiconductor memory that temporarily holds a program and data. The CPU 106 is a computation device that reads programs and data from the storage devices including the HDD 108 and the ROM 105 on the RAM 104, and executes processing, thereby implementing the entire control of the apparatus and the mounted functions.

With such configuration, in the line-of-sight analysis apparatus 10 according to the embodiments discussed herein, the CPU 106 executes line-of-sight analysis processing, using the line-of-sight analysis program 32 and data stored in the RAM 104, the ROM 105, and the HDD 108, for example. Noted that information stored in the line-of-sight information DB 30 and the threshold table 31 may be stored in the RAM 104, the HDD 108, and a server and the like on the cloud that are coupled to the line-of-sight analysis apparatus 10 via the network.

Noted that FIG. 2 is a block diagram drawn so as to focus on functions, and processors that execute software in the respective units illustrated by these function blocks are hardware. For example, the functions of the detection unit 12 and the acquisition unit 13 in FIG. 2 may be implemented by the input device 101, for example. The function of each of the determination unit 14, the calculation unit 15, and the identification unit 16 is implemented by processing in which the line-of-sight analysis program 32 causes the CPU 106 to execute, for example.

The function of the output unit 17 may be implemented by the output device 102, for example. The function of the memory unit 11 may be implemented by the RAM 104, the ROM 105, the HDD 108, or an information processing device that is coupled to the line-of-sight analysis apparatus 10 via the network, or another storage device on the cloud.

First Embodiment

[Line-of-Sight Analysis Processing]

Figure 5:
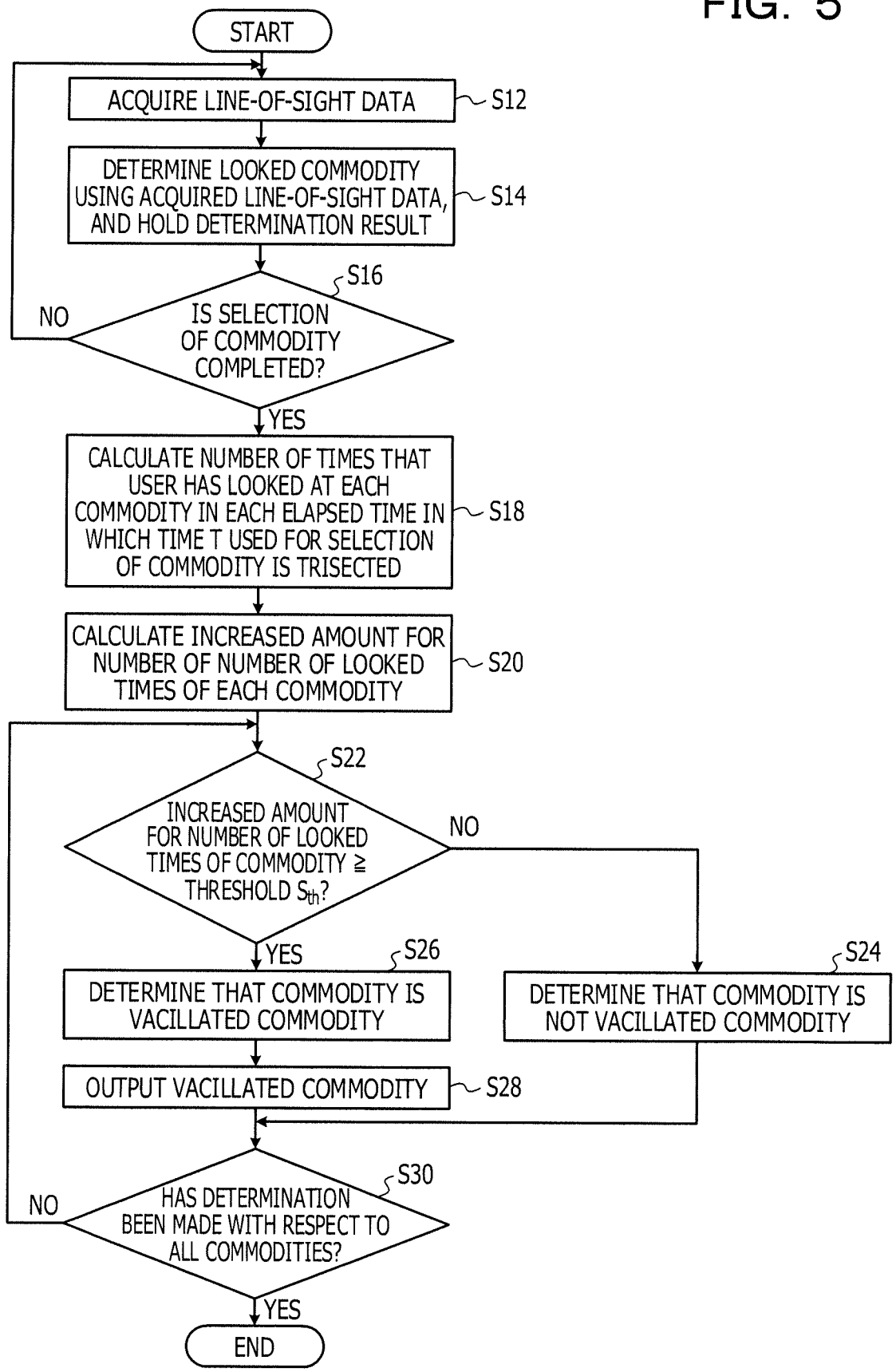
FIG. 5 is a flowchart illustrating one example of line-of-sight analysis processing according to the first embodiment.

Next, one example of line-of-sight analysis processing according to a first embodiment executed by the line-of-sight analysis apparatus 10 with the abovementioned configuration is described with reference to FIG. 5. FIG. 5 is a flowchart illustrating one example of the line-of-sight analysis processing according to the first embodiment. The line-of-sight analysis apparatus 10 estimates a vacillated commodity when a coming-to-the-shop user chooses with respect to commodities displayed on the digital signage 20 or arranged in the display showcase.

When this processing is started, the acquisition unit 13 acquires line-of-sight data from the line-of-sight sensor 22 (Step S12). The determination unit 14 then determines a "looked commodity", from coordinates of the acquired line-of-sight data, based on each commodity region, and holds a determination result in the column of the "looked commodity" of the line-of-sight information DB 30 (Step S14).

The determination unit 14 then determines whether a selection of a commodity is completed (Step S16). Until the selection of a commodity is completed, processes at Steps S12 and S14 are repeated. In the present embodiment, when the selection button 24 displayed on the digital signage 20 illustrated in FIG. 2 is pressed down, the determination unit 14 determines that the selection of a commodity is completed, and causes the processing to proceed to Step S18.

At Step S18, the calculation unit 15 trisects a time T used for the commodity selection, and calculates the number of looked times of each commodity in each trisected elapsed time. The time T used for the commodity selection is a time after the selection of a commodity is started and before the selection of a commodity is completed, which is counted. FIG. 6 illustrates one example of the number of looked times n of each commodity out of the commodities A to D, in each elapsed time out of the three time periods in which the time T used for the commodity selection is trisected, an elapsed time from a start (commodity selection start time) to T/3, an elapsed time from T/3 to 2T/3, and an elapsed time from 2T/3 to a completion (commodity selection completion time). The time T used for the commodity selection is a total time that the user uses from the selection start to the selection completion of the commodity, and for example, the unit may be seconds.

Referring back to FIG. 5, the calculation unit 15 then calculates an increased amount for the number of looked times n of each commodity (Step S20). In the present embodiment, the increased amount for the number of looked times n of each commodity is an increased amount for the number of looked times of the commodity within the elapsed time 2T/3 to the completion (commodity selection completion time), compared with the number of looked times of the commodity within the elapsed time from the start (commodity selection start time) to T/3.

Specifically, an increased amount D for the number of looked times of each commodity is calculated by subtracting the number of looked times of each commodity in the elapsed time from the start to T/3 from the number of looked times of each commodity in the elapsed time from 2T/3 to the completion. For example, in the example of FIG. 6, calculated are an increased amount Da for the number of looked times of the commodity A as −3 (=0−3), an increased amount Db for the number of looked times of the commodity B as 0 (=1−1), an increased amount Dc for the number of looked times of the commodity C as 1 (=1−0), and an increased amount Dd for the number of looked times of the commodity D as 2 (=2−0).

Referring back to FIG. 5, the identification unit 16 determines whether the increased amount D for the number of looked times of the commodity is not less than a threshold Sth (Step S22). If it is determined that the increased amount D for the number of looked times of the commodity is less than the threshold Sth, the identification unit 16 determines that the commodity to be objected is not a vacillated commodity (Step S24), and if all the commodities are determined (Step S30), and the identification unit 16 ends this processing. On the other hand, if it is determined that the increased amount for the number of looked times of the commodity is not less than the threshold Sth, the identification unit 16 determines that the commodity to be objected is a vacillated commodity (Step S26). With reference to FIG. 1C, the last time period out of the time T used for the commodity selection being trisected is the most recent period of a selection event, and is the time when the user vacillates on the purchase or the selection of the commodity. Therefore, a commodity having the more increased amount for the number of looked times of the commodity in the last time period than in the first time period may be estimated as a vacillated commodity. Therefore, if it is determined that the increased amount D for the number of looked times of the commodity is not less than the threshold Sth, it is determined in the present embodiment that the commodity to be objected is a vacillated commodity. For example, the commodity C and the commodity D each having the increased amount D for the number of looked times of the commodity being not less than the threshold are determined as vacillated commodities.

Referring back to FIG. 5, the output unit 17 then outputs the "vacillated commodity" identified at Step S26 (Step S28). The identification unit 16 then determines whether the determination as to whether the commodity is a vacillated commodity has been made with respect to all the commodities (Step S30), and ends this processing if the determination as to whether the commodity is a vacillated commodity has been made with respect to all the commodities. If the determination as to whether the commodity is a vacillated commodity has been not made with respect to all the commodities, the processing returns to Step S22, and repeats Steps S22 to S30 during when a commodity to which the determination as to whether the commodity is a vacillated commodity has been not made remains.

As in the foregoing, the line-of-sight analysis apparatus 10 according to the first embodiment sets a total time used before the user uses from the selection start to the selection completion of a commodity to T seconds, for example, and estimates a vacillated commodity based on the line-of-sight data detected during T seconds.

The user looks at a "vacillated object" many times at the time close to the selection completion (in other words, when a selection event is detected). Therefore, the line-of-sight analysis processing according to the first embodiment determines whether the commodity is a commodity under vacillation based on an increased amount for the number of looked times of each commodity relative to the time elapse.

For example, as illustrated in FIG. 1C, the line-of-sight analysis processing according to the first embodiment identifies a commodity vacillated on the selection, using the first elapsed time being a period when the user sequentially gazes at all the commodities, and the most recent elapsed period being a period when the user vacillates on between some commodities before the user selects a commodity at the end. For example, when the commodity D is selected at the end, based on an increased amount for the number of looked times between the most recent period and the first period, as FIG. 1D illustrates one example, the commodities C and D may be determined as "vacillated commodities".

Second Embodiment

[Line-of-Sight Analysis Processing]

Figure 7:
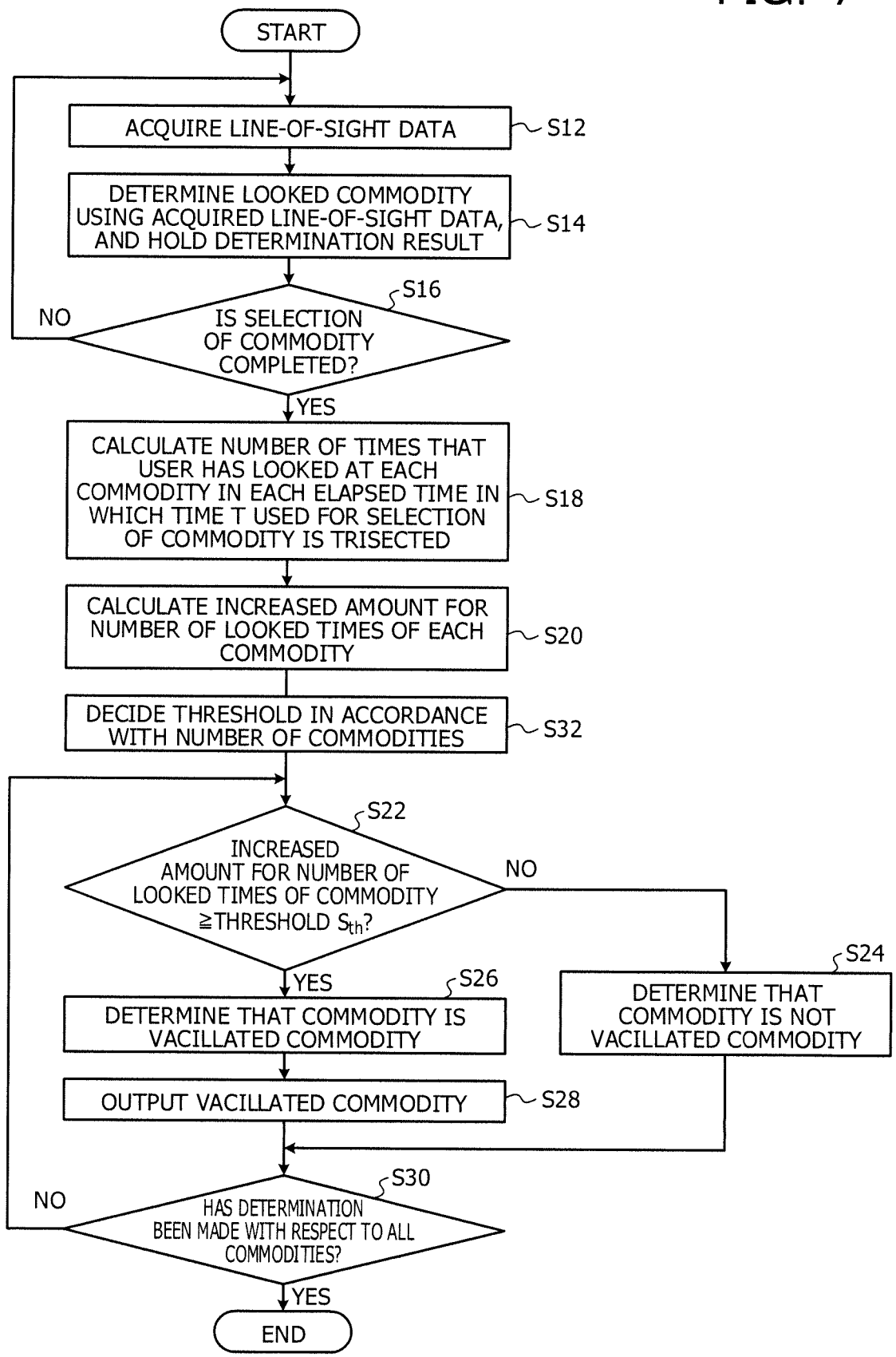
FIG. 7 is a flowchart illustrating one example of line-of-sight analysis processing according to the second embodiment.

Next, one example of line-of-sight analysis processing according to a second embodiment is described with reference to FIG. 7. FIG. 7 is a flowchart illustrating one example of the line-of-sight analysis processing according to the second embodiment. In the second embodiment, a threshold serving as a determination reference of vacillation is variable, which is different from the line-of-sight analysis processing according to the first embodiment. Noted that in the line-of-sight analysis processing according to the second embodiment in FIG. 7, the same step numbers are assigned to the steps the processes of which are the same as those in the line-of-sight analysis processing according to the first embodiment in FIG. 5.

When this processing is started, Steps S12 to S20 are executed, the calculation unit 15 calculates an increased amount for the number of looked times of each commodity based on line-of-sight data accumulated in the time T used for the commodity selection. The calculation unit 15 then decides a threshold in accordance with the number of commodities displayed on the digital signage 20 or arranged in the display showcase (Step S32).

Figures 8A, 8B:
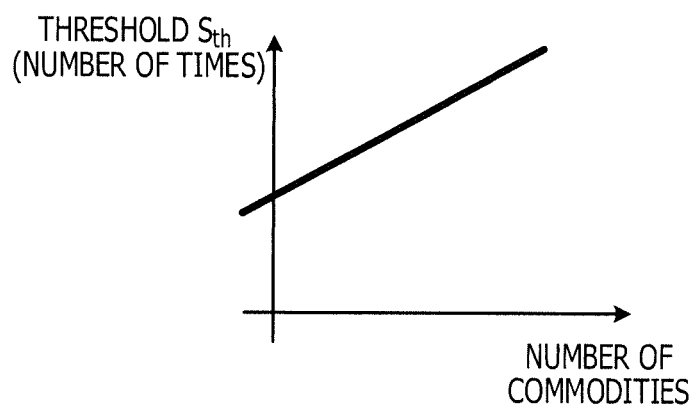
FIGS. 8A and 8B are diagrams illustrating one example of a method of deciding a threshold in the line-of-sight analysis processing according to the second embodiment.

For example, the calculation unit 15 may determine a threshold in accordance with the number of commodities with reference to the threshold table 31 illustrated in FIG. 8A. Many selection options of commodities increase the number of combinations of commodities to be compared. Accordingly, the user looks at the respective numbers of commodities at the relatively increased number of times more than in a case of the less number of selection options, thereby increasing a threshold for determining a vacillation state of the commodity. In the example of FIG. 8A, Sth2<Sth3<Sth4<Sth5 is obtained. The threshold Sth at Step S22 in FIG. 7 may be any one of Sth2, Sth3, Sth4, and Sth5.

As another example, the calculation unit 15 may calculate, as illustrated in FIG. 8B, a threshold in accordance with the number of commodities from an expression defined by Sth=an+b (a and b are coefficients set in advance).

Referring back to FIG. 7, the identification unit 16 determines whether the increased amount for the number of looked times of the commodity is not less than the determined threshold Sth (Step S22). If it is determined that the increased amount for the number of looked times of the commodity is less than the threshold Sth, the identification unit 16 determines that the commodity to be objected is not a vacillated commodity (Step S24). On the other hand, if it is determined that the increased amount for the number of looked times of the commodity is not less than the threshold Sth, the identification unit 16 determines that the commodity to be objected is a vacillated commodity (Step S26).

Many selection options of commodities increase the number of combinations to be compared, so that the user looks at the respective numbers of commodities at the relatively number of times more than that in a case of the less number of selection options. Therefore, the line-of-sight analysis apparatus 10 according to the second embodiment variably sets a threshold for determining a commodity under vacillation in accordance with the number of commodities. This makes it possible to determine a commodity for which the user has vacillated based on the line-of-sight data.

Third Embodiment

[Line-of-Sight Analysis Processing]

Figure 9:
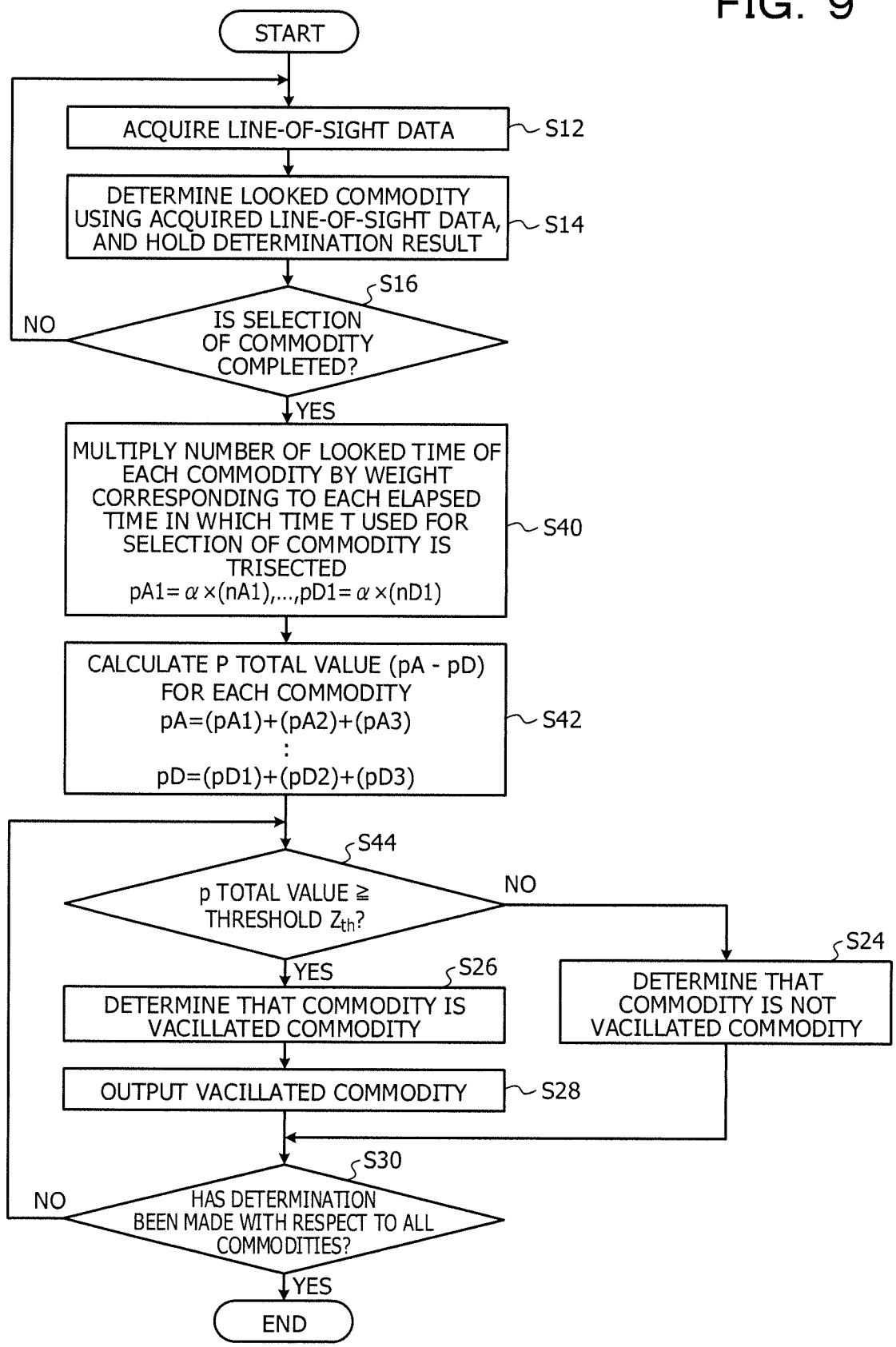
FIG. 9 is a flowchart illustrating one example of line-of-sight analysis processing according to the third embodiment.

Next, one example of line-of-sight analysis processing according to a third embodiment is described with reference to FIG. 9. FIG. 9 is a flowchart illustrating one example of the line-of-sight analysis processing according to the third embodiment.

Some user may turn his/her line-of-sight in a time period immediately before a selection completion of a commodity in such a manner that he/she looks at only a commodity for which the purchase is decided with efforts including picking up a commodity for which the purchase is decided and pressing the selection button 24. In this case, there is a possibility that a commodity for which the user has vacillated but has not purchased may not be correctly determined as vacillated commodity.

For example, this includes such a case that in a case where the commodity D is decided to be purchased, line-of-sight data to the commodity C when the user looks at the commodities C and D while vacillating is not collected immediately before the selection completion, and the commodity C may not be correctly determined as a vacillated commodity.

From the above, in the third embodiment, a "commodity at which the user did not look very much immediately before the selection completion but vacillated" may be determined by adding up the number of looked times for each elapsed time from the selection start of a commodity to which a weight in the time elapse is considered. Noted that in the line-of-sight analysis processing according to the third embodiment in FIG. 9, the same step numbers are assigned to the steps the processes of which are the same as those in the line-of-sight analysis processing according to the first embodiment in FIG. 5.

When this processing is started, Steps S12 to S16 are executed, and line-of-sight data is accumulated. The calculation unit 15 then trisects the time T used for the commodity selection, and calculates a value obtained by multiplying the number of looked times p of each commodity by a weight corresponding to each trisected elapsed time (Step S40). For example, FIG. 10 illustrates values pA each obtained by multiplying the number of looked times nA of the commodity A by a weight corresponding to each elapsed time (weight coefficient $\alpha$, $\beta$, or $\gamma$).

The weight coefficient $\alpha$, $\beta$, or $\gamma$ vary depending on the elapsed time. When the number of looked times n of the commodity A in the first embodiment is calculated as nA1 in the elapsed time (start to T/3), nA2 in the elapsed time (T/3 to 2T/3), and nA3 in the elapsed time (2T/3 to completion), the actual number of looked times n is multiplied by a weight coefficient in the present embodiment. As a result, in the third embodiment the number of looked times p of the commodity A is calculated as pA1 (=$\alpha \times$nA1) in the elapsed time (start to T/3), pA2 (=$\alpha \times$nA2) in the elapsed time (T/3 to 2T/3), and pA3 (=$\alpha \times$nA3) in the elapsed time (2T/3 to completion).

Referring back to FIG. 9, the calculation unit 15 then calculates weighted total values pA to pD (hereinafter, also referred to as "p total value") of the number of looked times for the respective commodities (Step S42). For example, pA that is a p total value of the commodity A may be obtained by adding values each of which is obtained by multiplying the number of looked times of the commodity in each elapsed time by a weight as indicated in an expression (1).

$$pA = pA1 + pA2 + pA3 = \alpha \times nA1 + \beta nA2 + \gamma nA3 \quad (1)$$

Also with respect the other commodities B to D, pB to pD that are respective p total values of the commodities B to D are respectively calculated as indicated in an expression (2) to expression (4).

$$pB = pB1 + pB2 + pB3 = \alpha \times nB1 + \beta nB2 + \gamma nB3 \quad (2)$$

$$pC = pC1 + pC2 + pC3 = \alpha \times nC1 + \beta nC2 + \gamma nC3 \quad (3)$$

$$pD = pD1 + pD2 + pD3 = \beta \times nD1 + \beta nD2 + \gamma nD3 \quad (4)$$

When the user has vacillated among a plurality of commodities, the number of times that the user looks at the commodities increases, however, immediately before the commodity selection completion in which the user decides to select or purchase one commodity out of the commodities, turns his/her line-of-sight only to the commodity to be selected. In the present embodiment, weights $\alpha$, $\beta$, and $\gamma$ in the elapsed times are set to values having a magnitude relationship of $\alpha \leq \beta \leq \gamma$ by considering the use way of the line-of-sight of the user, a "commodity at which the user did not look very much immediately before the selection completion but vacillated" may be identified with high accuracy by considering the weight with the time elapse.

The identification unit 16 then determines whether the p total value of the number of looked times for each commodity by considering the weights in the elapsed times is not less than a threshold Zth (Step S44). If it is determined that the p total value for each commodity is less than the threshold Zth, the identification unit 16 determines that the commodity to be objected is not a vacillated commodity (Step S24). On the other hand, if it is determined that the p total value for each commodity is not less than the threshold Zth, the identification unit 16 determines that the commodity to be objected is a vacillated commodity (Step S26), and outputs the vacillated commodity (Step S28). The identification unit 16 repeats the processes at Steps S44 and S24 to S30 until determining all the commodities, and ends this processing after determining all the commodities.

As in the foregoing, the line-of-sight analysis apparatus 10 according to the third embodiment identifies whether the commodity is a "vacillated commodity" based on the p total value for each commodity in which weights $\alpha$, $\beta$, and $\gamma$ ($\alpha \leq \beta \leq \gamma$) in the elapsed times are considered. With this, for example, when the user has vacillated between the commodities C and D, not only the selected commodity out of the commodities C and D but also the commodity for which the user has vacillated but did not select may be identified as a "commodity at which the user did not look very much immediately before the selection completion but vacillated" with high accuracy by considering the weight with the time elapse.

Modification Example of Third Embodiment

[Line-of-Sight Analysis Processing]

Figure 11:
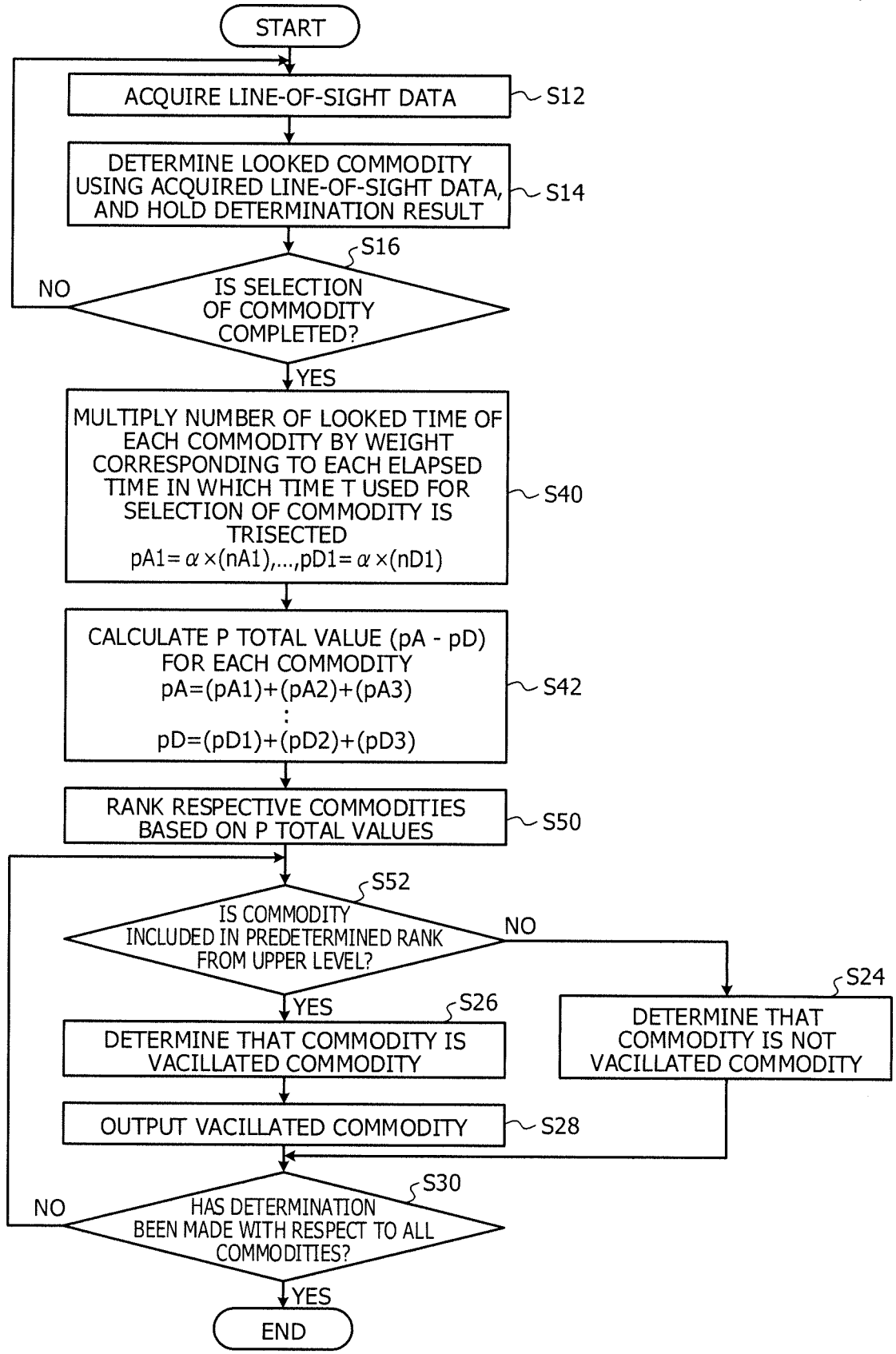
FIG. 11 is a flowchart illustrating one example of line-of-sight analysis processing according a modification example of the third embodiment.

Next, one example of line-of-sight analysis processing according to a modification example of the third embodiment is described with reference to FIG. 11. FIG. 11 is a flowchart illustrating one example of the line-of-sight analysis processing according to the modification example of the third embodiment. The line-of-sight analysis processing according to the modification example of the third embodiment is different from the line-of-sight analysis processing according to the third embodiment in which a commodity is identified as a vacillated commodity by comparing the p total value with the threshold, in that a commodity included within a predetermined number from the upper level of the weighted total values pA to pD (p total value) of the number of looked times for the respective commodities is identified as a vacillated commodity. Noted that in the line-of-sight analysis processing according to the modification example of the third embodiment in FIG. 11, the same step numbers are assigned to the steps the processes of which are the same as those in the line-of-sight analysis processing according to the third embodiment.

When this processing is started, Steps S12 to S16, S40, and S42 are executed, similar to the third embodiment, the calculation unit 15 calculates weighted total values pA to pD (p total values) of the number of looked times for the respective commodities (Step S42).

The calculation unit 15 then uses the weighted total values pA to pD (p total values) of the number of looked times for the respective commodities as a score, and ranks the respective commodities in decreasing order of score (Step S50). The identification unit 16 then determines whether the commodity is included in a predetermined rank from the upper level in accordance with the result in which the respective commodities are ranked (Step S52). If it is determined that the commodity is not in the predetermined rank from the upper level, the identification unit 16 determines that the commodity to be objected is not a vacillated commodity (Step S24). On the other hand, if it is determined that the commodity is in the predetermined rank from the upper level, the identification unit 16 determines that the commodity to be objected is a vacillated commodity (Step S26), and outputs the vacillated commodity (Step S28). The identification unit 16 repeats the processes at Steps S52 and S24 to S30 until determining all the commodities, and ends this processing after determining all the commodities.

As in the foregoing, the line-of-sight analysis apparatus 10 according to the modification example of the third embodiment identifies whether the commodity is a "vacillated commodity", similar to the third embodiment, using the p total values for the respective commodities in which weights in the elapsed times are considered as scores. With this, a "commodity at which the user did not look very much immediately before the selection completion but vacillated" may be identified with high accuracy by considering the weight with the time elapse.

Fourth Embodiment

[Line-of-Sight Analysis Processing]

Figure 12:
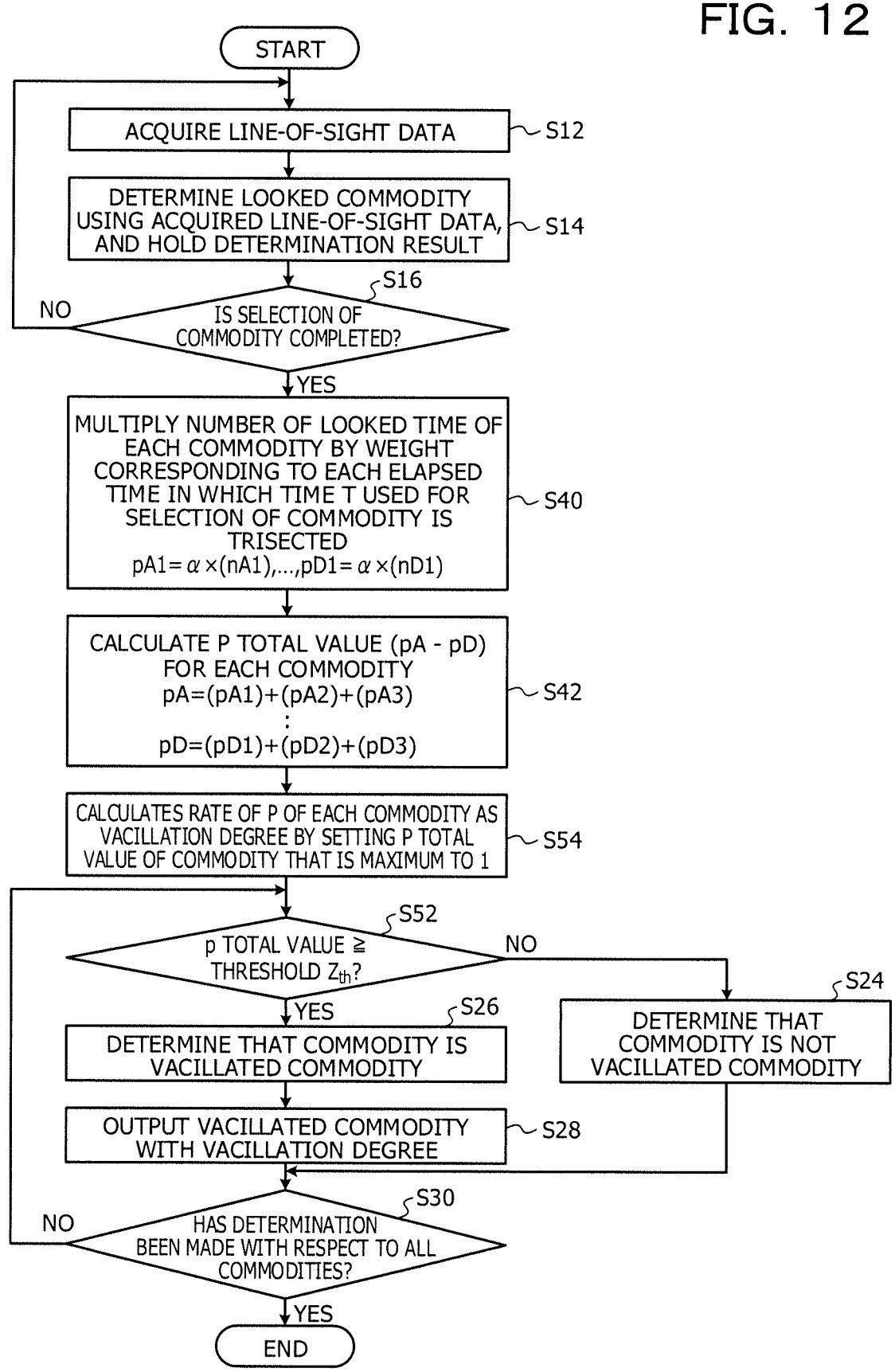
FIG. 12 is a flowchart illustrating one example of line-of-sight analysis processing according to the fourth embodiment.

Next, one example of line-of-sight analysis processing according to a fourth embodiment is described with reference to FIG. 12. FIG. 12 is a flowchart illustrating one example of the line-of-sight analysis processing according to the fourth embodiment. The fourth embodiment is different from the third embodiment in that in addition to the line-of-sight analysis processing according to the third embodiment in FIG. 9, a vacillation degree indicating a degree of vacillation of the commodity calculated from the p total value, and outputs the vacillation degree with the vacillated commodity when being outputted. Noted that in the line-of-sight analysis processing according the fourth embodiment in FIG. 12, the same step numbers are assigned to the steps the processes of which are the same as those in the line-of-sight analysis processing according to the third embodiment in FIG. 9.

When this processing is started, Steps S12 to S16, S40, and S42 are executed, similar to the third embodiment, weighted total values pA to pD (p total values) of the number of looked times for the respective commodities are calculated. The calculation unit 15 then calculates a rate of each commodity as a vacillation degree, by setting a p total value of the commodity that is the maximum in the weighted total values pA to pD (p total values) of the number of looked times for the respective commodities to 1, (Step S54).

The identification unit 16 then executes the processes at Steps S44 and S24 to S28, and if it is determined that the commodity is in the predetermined rank from the upper level, the identification unit 16 determines that the commodity to be objected is a vacillated commodity (Step S26), and outputs the vacillated commodity with the vacillation degree of the commodity (Step S28). The identification unit 16 then determines whether the commodity is a vacillated commodity with respect to all the commodities (Step S30), and then ends this processing.

As in the foregoing, the line-of-sight analysis apparatus 10 according to the fourth embodiment may output the vacillation degree of the vacillated commodity. This may present not only a commodity for which the user has vacillated but also the extent of the magnitude that the user has vacillated over the commodity.

Noted that in the fourth embodiment, the vacillation degree calculated from the p total value may be outputted with the vacillated commodity at Step S28 in FIG. 11 of the line-of-sight analysis processing according to the modification example of the third embodiment, instead of the third embodiment.

Fifth Embodiment

[Line-of-Sight Analysis Processing]

Figure 13:
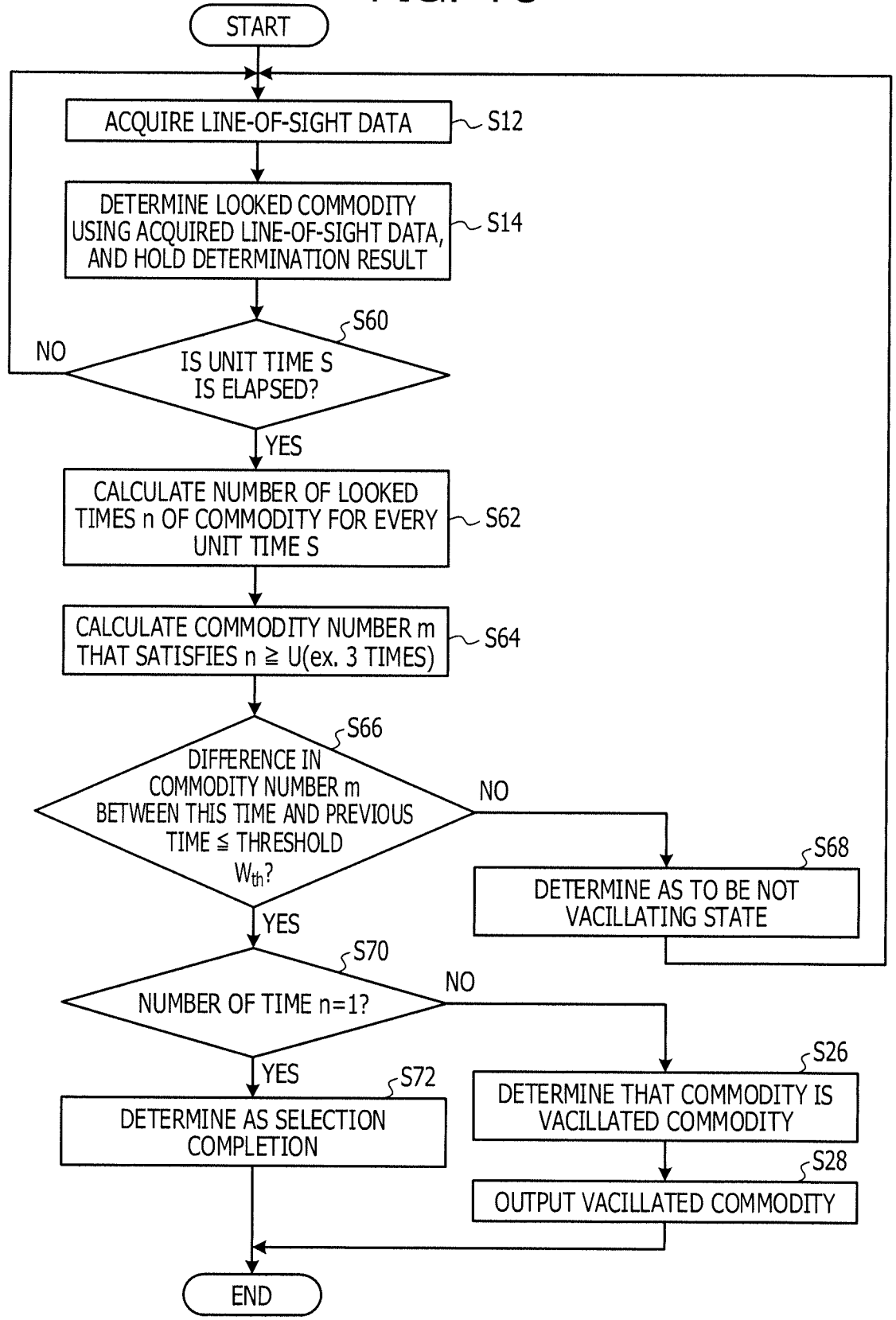
FIG. 13 is a flowchart illustrating one example of line-of-sight analysis processing according to the fifth embodiment.

Next, one example of line-of-sight analysis processing according to a fifth embodiment is described with reference to FIG. 13. FIG. 13 is a flowchart illustrating one example of the line-of-sight analysis processing according to the fifth embodiment. In the first embodiment to the fourth embodiments, the time T used for the used selection is trisected, and a vacillated commodity is identified based on the number of looked times of the looked commodity for each elapsed time.

However, when the time T used for the used selection is unknown, a commodity under vacillation is erroneously identified in some cases because it is impossible to distinguish whether the number of looked times of the commodity for each elapsed time corresponds a state of checking a commodity to be objected at the beginning or a state of vacillating just before the selection completion of a commodity.

Figure 14:
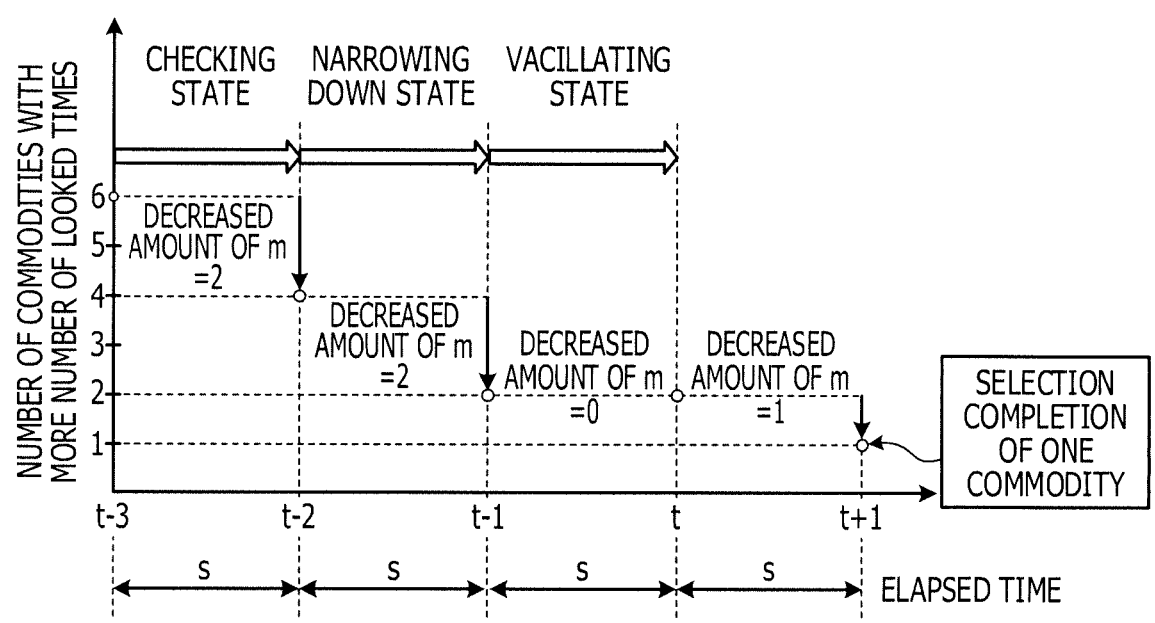
FIG. 14 is a diagram for explaining the line-of-sight analysis processing according to the fifth embodiment.

As illustrated in FIG. 14, when a commodity is selected, the line-of-sight of the user shifts from a state of checking each of a plurality of commodities, a state of narrowing down some commodities from the plurality of commodities, to a vacillating state just before the selection completion of a commodity. Further, the user in the vacillating state looks at the few number of commodities to eventually select a commodity.

Therefore, the line-of-sight analysis processing according to the fifth embodiment sets a unit time of the elapsed time as s, calculates the number of looked times n of the commodity for each elapsed time s, and calculates the number of commodities m with the number of looked times n being not less than a threshold. For example, the number of commodities m being looked at not less than the threshold is calculated for each unit time s such as a unit time s from a time (t−3) to a time (t−2) and a unit time s from the time (t−2) a time (t−1), and determines a vacillated commodity based on the decreased amount of m. Specifically, this processing is started in FIG. 13, the acquisition unit 13 acquires line-of-sight data from the line-of-sight sensor 22 (Step S12). The determination unit 14 then determines a looked commodity from the acquired line-of-sight data, and holds a determination result in the column of the "looked commodity" of the line-of-sight information DB 30 (Step S14). The acquisition unit 13 then determines whether the unit time s is elapsed (Step S60). The acquisition unit 13 repeats the processes at Steps S12, S14, and S60 until the unit time s is elapsed.

If it is determined that the unit time s is elapsed, the calculation unit 15 calculates the number of looked times n of the commodity for each unit time s (Step S62). For example, FIG. 15 illustrates one example of calculation results of the number of looked times n (nA to nI) of commodities A to I for each unit time s in accordance with the time elapse of a time (t−4), a time (t−3), . . . , a time t, a time (t+1).

Referring back to FIG. 13, the calculation unit 15 then calculates the commodity number m that satisfies a condition in which the number of looked times n of the commodity in the unit time s is not less than a threshold U (for example, 3 times) of the number of looked times per unit time s (Step S64). The commodity number m that satisfies the condition of the number of looked times being not less than the threshold U indicates the number of commodities in which the number of looked times is more than a predetermined number. Hereinafter, the commodity number m for each unit time s corresponding to the time elapse of the time (t−2), (t−1), t . . . , is m(t−2), m(t−1), m(t) . . . . When the commodity number m (=mold) calculated at this time is m(t−1), the time commodity number m (=mnew) calculated at the previous time is m(t−2).

The calculation unit 15 then determines whether a difference (=mold−mnew) in commodity number between this time and previous time is not more than a threshold Wth of the m decreased amount set in advance (Step S66). If it is determined that the difference in commodity number between this time and previous time is more than the threshold Wth, the identification unit 16 determines as to be a not vacillating state of the commodity (Step S68), and causes the processing to return to the process at Step S12.

In the example illustrated in FIG. 15, a selection of a commodity is started at the time (t−4), and the number of looked times n of each commodity is calculated at each unit time s. FIG. 16A illustrates, in the example of FIG. 15, commodity numbers m(t−4), m(t−3), m(t−2), . . . that are calculated for each unit time s that elapses the time elapse (t−4), (t−3), (t−2), . . . and satisfies the condition of the number of looked times n being not less than the threshold U. In this case, the decreased amount (=mold−mnew) of the commodity number m is shifted as 3→2→2→0→1, as illustrated in FIG. 16B.

When the threshold Wth of the decreased amount of the commodity number m is set to "1", the identification unit 16 determines that the user does not vacillate on a selection of a commodity during when it is determined that the decreased amount of the commodity number m is more than "1" at Step S66 in FIG. 13. In other words, in the present embodiment, as illustrated in FIG. 16B, when the decreased amount of the commodity number m is more than 1, it is determined as to be a not vacillating state of a selection of a commodity (the checking state of the commodity or the narrowing down state of the commodity in FIG. 14).

On the other hand, at Step S66, if it is determined that the decreased amount of the commodity number m is not more than "1", the identification unit 16 determines whether the number of looked times n of the commodity is "1" (Step S70). If it is determined that the number of looked times n of the commodity is not "1", the identification unit 16 determines that the commodity is a vacillated commodity (Step S26). The output unit 17 outputs the commodity determined as to be vacillated (Step S28), and ends this processing.

On the other hand, at Step S70, if it is determined that the number of looked times n of the commodity is "1", the identification unit 16 determines that the selection of a commodity is completed because one commodity is looked in the unit time (Step S72), and ends this processing.

In the present embodiment, when the decreased amount of the commodity number m is not less than 2, it is determined as to be a not vacillating state of a selection of a commodity (the checking state of the commodity or the narrowing down state of the commodity). As a result, in the example of FIG. 14, it is determined that the unit time s from the time (t−3) to the time (t−2) and the unit time s from the time (t−2) to the time (t−1) are determined as to be a not vacillating state of a selection of a commodity. In contrast, when the decreased amount of the commodity number m is less than 2, it is determined as to be a vacillating state of a selection of a commodity or a state where the selection of a commodity is completed. As a result, in the example of FIG. 14, the commodity at which the user looked in the unit time s from the time (t−1) to the time t is identified as a vacillated commodity. Moreover, the time (t+1) is determined as the selection completion time of the commodity.

As in the foregoing, the line-of-sight analysis apparatus 10 according to the fifth embodiment determines whether the user vacillates on a selection of a commodity, based on a detection status of line-of-sight for each unit time s, from a difference between the detection frequency or the number of detections of the line-of-sight in one unit time and the detection frequency or the number of detections of the line-of-sight in a unit time immediately after the one unit time, and outputs a commodity identified as being vacillated. This may estimate a vacillation state of the commodity just before the selection completion of the commodity, even when the time T used from the selection start to the selection completion of a commodity sis unknown.

As described above, the line-of-sight analysis apparatuses 10 according to the first to fifth embodiments may correctly identify an object for which the user has vacillated on the selection, based on the line-of-sight data. The vacillated object includes a purchased object and a not-purchased object. Accordingly, when the user vacillates over but does not purchase a commodity, information on the vacillated commodity may be obtained.

This enables the side that sales commodities to execute sales promotion of the commodities based on information on vacillated commodities, by considering not only the purchase status but also the non-purchase status. Moreover, this enables the side that manufactures commodities to develop commodities based on information on vacillated commodities, by considering not only the purchase status but also the non-purchase status.

Sixth to Eighth Embodiments

Figure 17:
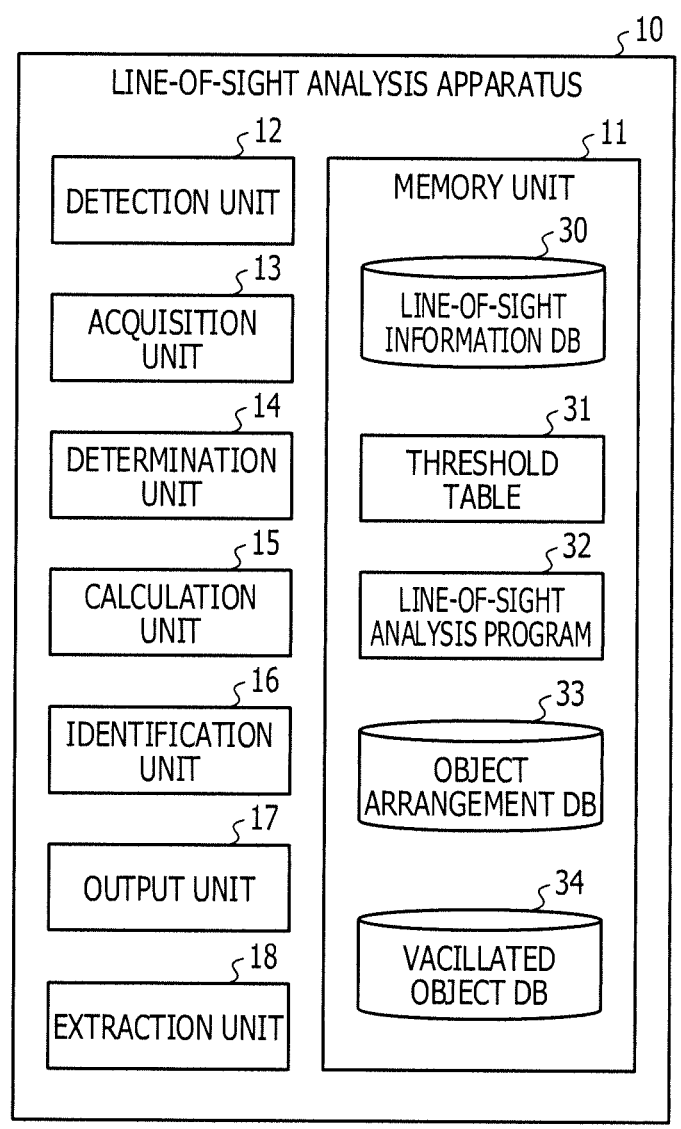
FIG. 17 is a diagram illustrating one example of a function configuration of a line-of-sight analysis apparatus according to sixth to eighth embodiments.

Next, the function configuration of the line-of-sight analysis apparatus 10 according to sixth to eighth embodiments is described, and one example of the line-of-sight analysis processing according to the sixth to eighth embodiments is described. FIG. 17 illustrates one example of a function configuration of the line-of-sight analysis apparatus 10 according to the sixth to eighth embodiments.

[Function Configuration o Line-of-Sight Analysis Apparatus]

When being compared with the line-of-sight analysis apparatus according to the first to fifth embodiments in FIG. 2, an extraction unit 18 is added in the line-of-sight analysis apparatus 10 according to the sixth to eighth embodiments in FIG. 17. Moreover, an object arrangement DB 33 and a vacillated object DB 34 are added in the memory unit 11.

Figure 18:
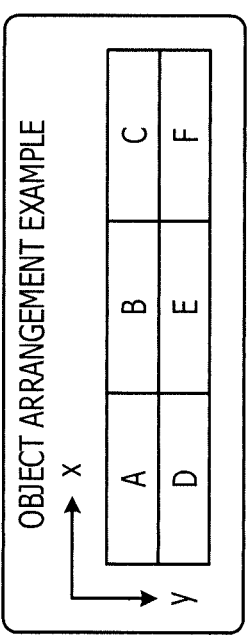
FIG. 18 is a diagram illustrating one example of an object arrangement DB according to the one embodiment.

The extraction unit 18 extracts a commodity as a vacillated object out of commodities in which the number of looked times is not less than a threshold. FIG. 18 is a diagram illustrating one example of the object arrangement DB 33 according to one embodiment. For example, when commodities A to F are arranged as illustrated in an object arrangement example at the lower side in FIG. 18, arrangement (row, stage) of objects, in other words, the commodities A to F, and left-upper coordinates and right-lower coordinates of the commodity are stored in the object arrangement DB 33. FIG. 19 is a diagram illustrating one example of the vacillated object DB 34 according to the one embodiment. The vacillated object DB 34 stores therein a client ID, a purchased commodity, and a vacillated commodity, for each client. In the vacillated commodity, a vacillated commodity (hereinafter, also referred to as "vacillated object commodity") extracted by the extraction unit 18 is stored. The number of vacillated commodities being 0 indicates that no candidate for the vacillated object commodity is present, or out of candidates for the vacillated object commodity, a commodity at which the user looked before and after the purchase object commodity is not present. The number of vacillated commodities being 1 indicates that out of candidates for the vacillated object commodity, a commodity at which the user looked before or after the purchase object commodity is present. The number of vacillated commodities being 2 indicates that out of candidates for the vacillated object commodity, commodities at which the user looked before and after the purchase object commodity are present. The purchase object commodity is one example of the first object.

Noted that the object arrangement DB 33 in FIG. 18 may be used in the line-of-sight analysis apparatuses 10 according to the first to fifth embodiments when a looked commodity (see (c) of FIG. 3) is determined based on each commodity region from the coordinates of the line-of-sight data.

Sixth Embodiment

[Line-of-sight Analysis Processing]

Figure 20:
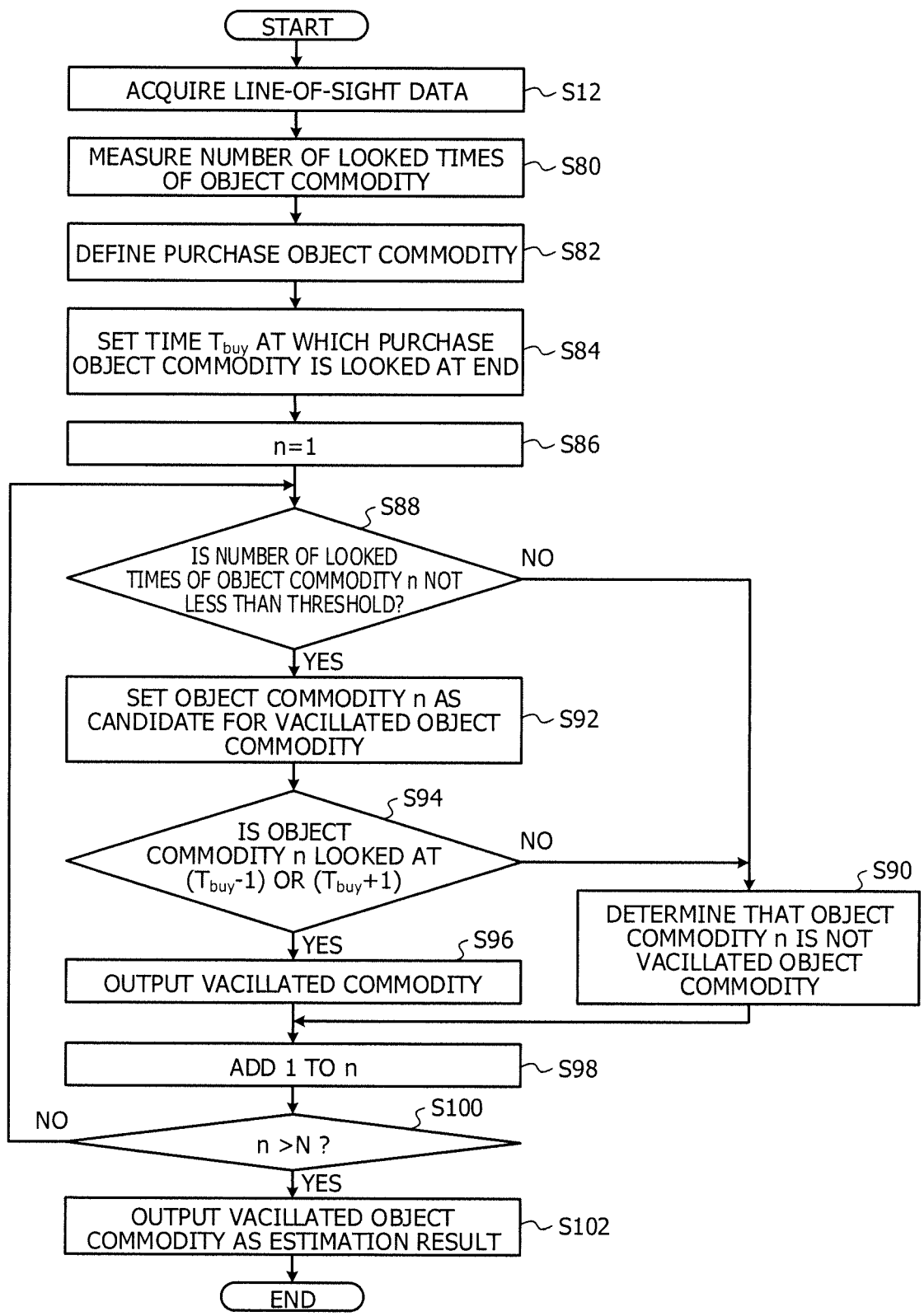
FIG. 20 is a flowchart illustrating one example of line-of-sight analysis processing according to the sixth embodiment.
Figure 21A:
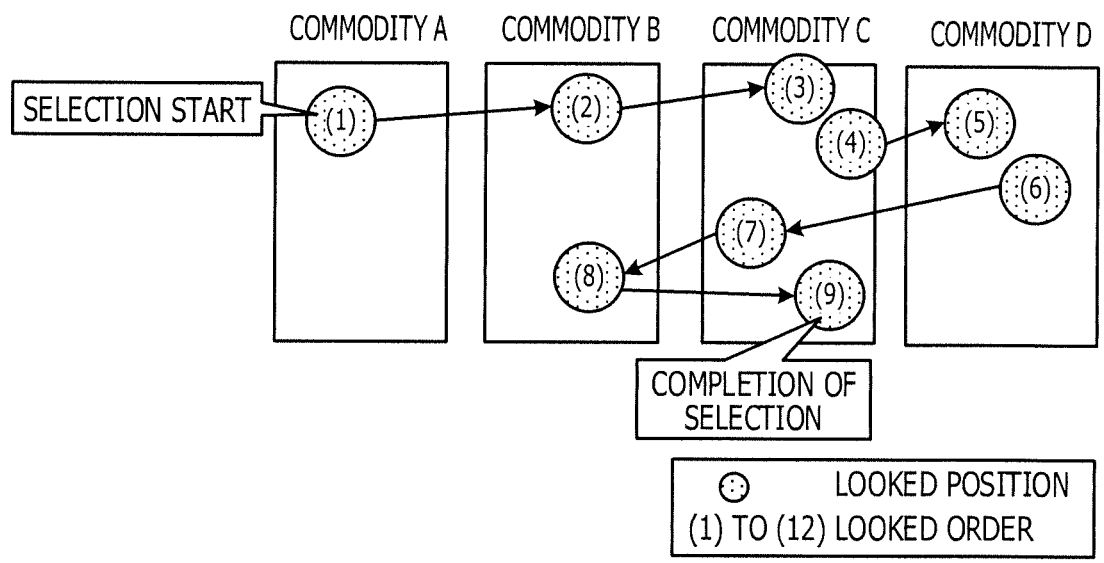
FIGS. 21A and 21B are diagrams for explaining the line-of-sight analysis processing according to the sixth embodiment.
Figure 21B:
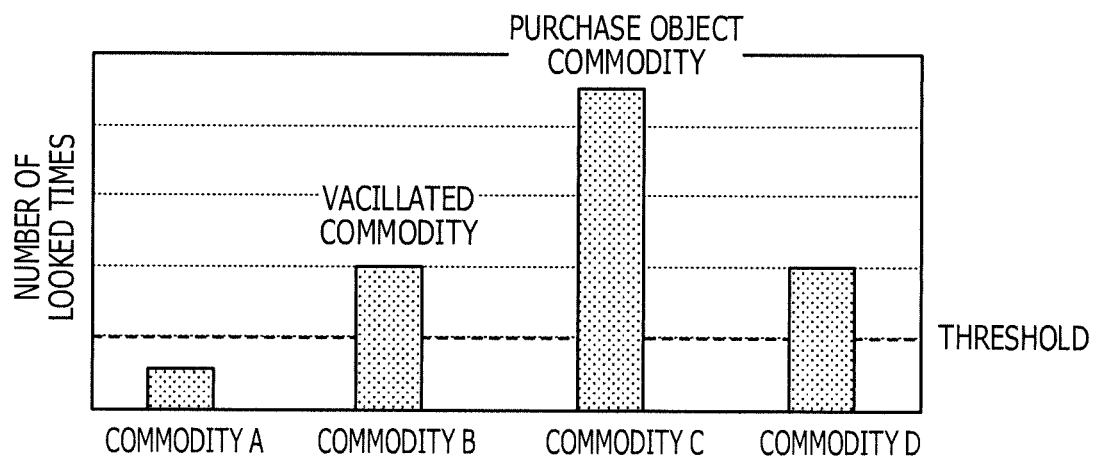

Next, one example of line-of-sight analysis processing according to the sixth embodiment is described with reference to FIGS. 20, 21A, and 21B. FIG. 20 is a flowchart illustrating one example of the line-of-sight analysis processing according to the sixth embodiment. FIGS. 21A and 21B are diagrams for explaining the line-of-sight analysis processing according to the sixth embodiment.

When this processing is started, the acquisition unit 13 acquires line-of-sight data from the line-of-sight sensor 22 (Step S12). The acquiring method is similar to the method described in the first embodiment to the fifth embodiment.

The determination unit 14 then determines a "looked commodity", from coordinates of the acquired line-of-sight data, based on each commodity region, and holds a determination result in the column of the "looked commodity" of the line-of-sight information DB 30 illustrated in (c) of FIG. 3, and the calculation unit 15 uses the looked commodity to be objected commodity, and measures the number of looked times for each object commodity (Step S80). Noted that the calculation unit 15 may measure the total looked time for each object commodity, instead of the number of looked times. The method of determining a "looked commodity" based on each commodity region from coordinates of the line-of-sight data is similar to the method described in the first embodiment and other embodiments.

The number of looked times of the object commodity is one example of the number of detections of the line-of-sight to the object commodity for each predetermined time. The total looked time of the object commodity or the rate of the looked time of each object commodity is one example of the detection frequency of the line-of-sight to the object commodity for each predetermined time.

Noted that the definition of "looked" or "gazed" of a commodity may represent measuring line-of-sight data in the same area (radius 50 mm) continuously for not less than 0.4 seconds. Noted that the definition of "looked" or "gazed" is not limited to this.

The extraction unit 18 then defines a purchase object commodity (Step S82). For example, when the user purchases a commodity displayed in the shop, the extraction unit 18 may extract a commodity registered in the POS system from POS information, and set the commodity as a purchase object commodity. Moreover, as for a purchase object commodity, the extraction unit 18 may define an object commodity or the like in which the number of looked times is the maximum as a purchase object commodity, or a purchase object commodity from an operation of a purchase button (of a vending machine or a touch signage).

The extraction unit 18 then sets a time Tbuy at which the purchase object commodity is looked at the end (Step S84). In the present embodiment, as illustrated in (c) of FIG. 3, the total time used from a stop by a shop visitor makes, the selection start of a commodity to be purchased, to the selection completion is set to T. For example, when a purchase object commodity is looked at the end in the unit time of the record time "20160728-134026-659" in the second from the bottom in (c) of FIG. 3, the time "20160728-134026-659" is indicated as Tbuy. Moreover, the time immediately before the unit time, in other words, the time "20160728-134026-527" is indicated as (Tbuy−1), and the time immediately after the unit time, in other words, the time period "20160728-134026-790" is indicated as (Tbuy+1).

Referring back to FIG. 20, the extraction unit 18 then sets 1 to a variable n (Step S86). The variable n is an integer ranging from 1 to N (N≥1). N is the number of object commodities that are the commodities looked during the total the time T.

The extraction unit 18 then determines whether the number of looked times of the object commodity (n) is not less than a threshold (Step S88). If the extraction unit 18 determines that the number of looked times of the object commodity (n) is less than the threshold, the identification unit 16 determines that the object commodity (n) is not a vacillated object commodity (Step S90), adds 1 to the variable n (Step S98), and causes the processing to proceed to Step S100. At Step S100, if the identification unit 16 determines that the variable n is not more than the number of object commodities N, the identification unit 16 causes the processing to return to Step S88, and repeats the process at Step S88 and the subsequent processes.

On the other hand, at Step S88, if the extraction unit 18 determines that that the number of looked times of the object commodity (n) is not less than the threshold, the identification unit 16 determines that the object commodity (n) is a candidate for the vacillated object commodity, and sets the object commodity (n) as a candidate for the vacillated object commodity (Step S92). The identification unit 16 then determines whether the object commodity (n) is looked at the time (Tbuy−1) immediately before the time Tbuy at which the purchase object commodity is looked at the end or at the time (Tbuy+1) immediately after the time Tbuy at which the purchase object commodity is looked at the end (Step S94).

If the identification unit 16 determines that the object commodity (n) is not looked at the time (Tbuy−1) immediately before the time Tbuy at which the purchase object commodity is looked at the end nor at the time (Tbuy+1) immediately after the time Tbuy at which the purchase object commodity is looked at the end, the identification unit 16 determines that the object commodity (n) is not a vacillated object commodity (Step S90). The identification unit 16 then adds 1 to the variable n (Step S98), causes the process to Step S100. If the identification unit 16 determines that the variable n is not more than the number of object commodities N, the identification unit 16 causes the processing to return to Step S88, and repeats the process at Step S88 and the subsequent processes.

At Step S94, if the identification unit 16 determines that the object commodity (n) is looked at the time (Tbuy−1) immediately before the time Tbuy at which the purchase object commodity is looked at the end or at the time (Tbuy+1) immediately after the time Tbuy at which the purchase object commodity is looked at the end, the identification unit 16 sets the object commodity (n) as a vacillated commodity in the vacillated object DB 34 of FIG. 19 (Step S96). The identification unit 16 then adds 1 to the variable n (Step S98), causes the processing to proceed to Step S100. If the identification unit 16 determines that the variable n is not more than the number of object commodities N, the identification unit 16 causes the process to return to Step S88, and repeats the process at Step S88 and the subsequent processes.

At Step S100, if the identification unit 16 determines that the variable n is more than the number of object commodities N, the output unit 17 outputs the vacillated object commodity as an estimation result (Step S102), and ends this processing.

As in the foregoing, the line-of-sight analysis processing according to the sixth embodiment extracts, based on the detection status of line-of-sight of a plurality of object commodities, an object commodity in which the number of detections for each predetermined time of the plurality of object commodities is relatively large, as a candidate for the vacillated object commodity. In the present embodiment, as the object commodity in which the number of detections for each predetermined time is relatively large, a commodity in which the number of looked times is not less than a threshold is extracted. Further, a candidate for the vacillated object commodity is not limited to this, but an object commodity in which the detection frequency of the line-of-sight or the total time of the line-of-sight to the plurality of object commodities for each predetermined time is relatively large may be extracted as a candidate for the vacillated object commodity.

In the present embodiment, firstly, detected is a selection event (detected from POS information, a purchase button being pressed down, and the like) or a selection prediction event (detected from an object commodity or the like in which the number of looked times is the maximum) with respect to a purchase object commodity or a purchase object prediction commodity, which is described later, is detected out of a plurality of object commodities. Further, based on detection status of line-of-sight of the candidates for the vacillated object commodity in at least either one of a time before and a time after the time when the selection event or the selection prediction event is detected, out of candidates for the object commodity, at least one object commodity is identified. Further, information on the identified object commodity is outputted as a vacillated commodity.

The determination as to whether a commodity is looked before and after the purchase object commodity may result in erroneous determination about a commodity that is coincidentally looked immediately before the purchase in some cases. Accordingly, in the present embodiment, firstly, extracted is an object commodity in which the number of looked times is large as a candidate for the vacillated object commodity. In other words, a commodity in which the number of looked times is not less than a threshold is regarded as a commodity in which the user is interested, and is set as a candidate for the vacillated object commodity. As for an extraction method of a candidate for the vacillated object commodity, a commodity in which the number of looked times is not less than a threshold may be extracted, or commodities of a predetermined upper-level number in which the number of looked times is large may be extracted.

Further, the vacillated commodity is narrowed down depending on the condition that the candidate for the vacillated object commodity is not a purchase object commodity and is looked at a time immediately before or immediately after the time when the purchase object commodity is selected. In other words, the candidate for the vacillated object commodity when being looked at the time immediately before or immediately after the time when the purchase object commodity is selected is identified as a "vacillated commodity".

In other words, the user compares a "vacillated commodity" just before the selection (purchase) completion with a "purchase object commodity". When the user decides a purchase object commodity from a plurality of object commodities, the abovementioned operation by the user causes the candidates for the purchase object commodity to be gradually narrowed down. The candidates for the purchase object commodity are also candidates for the vacillated commodity, so that extracting the vacillated commodity by the looking way of comparing the object commodity purchased at the end with the vacillated object commodity may bring more correct estimation of the "vacillated commodity" about buying.

For example, in the example of FIGS. 21A and 21B, the commodities B and D are extracted as candidates for the vacillated object commodity. Out of the commodities B and D, the commodity B that is looked at the time immediately before or immediately after the time when the purchase object commodity C is selected is set as a vacillated commodity, while the commodity D that is not looked at the time immediately before or immediately after the time when the purchase object commodity is selected is not set as a vacillated commodity. This makes it possible to more correctly estimate a "vacillated commodity" about buying that is not purchased based on line-of-sight data for which the user looks the object commodity. This makes it possible to more improve the determination accuracy of an object commodity in which the user is interested in the second place after the purchase object commodity.

In the present embodiment, at the time immediately before or immediately after the time when the purchase object commodity is selected (immediately before and immediately after the time when the purchase object commodity is selected is also described as (before and after ±1)), whether a candidate for the vacillated object commodity is looked by the user is determined. However, the time of the determination is not limited to this, whether a candidate for the vacillated object commodity is looked at the time either one of the time before or the time after the purchase object commodity is selected may be determined.

For example, whether a candidate for the vacillated object commodity is looked by the user may be determined in the (before and after ±2) range of the time when the purchase object commodity is selected, or may be determined in the (before and after ±3) range of the time when the purchase object commodity is selected. Moreover, depending on the looked number of object commodities N, the time before and the time after the time when the purchase object commodity is selected may be variable. For example, in a case of the small number of commodities number, whether a candidate for the vacillated object commodity is looked determined in the limited time by ±1 before and after the time when the purchase object commodity is selected, while the large number of commodities number, whether a candidate for the vacillated object commodity is looked determined within the range of ±2 before and after or the range of ±3 before and after the time when the purchase object commodity is selected.

Figures 22A, 22B:
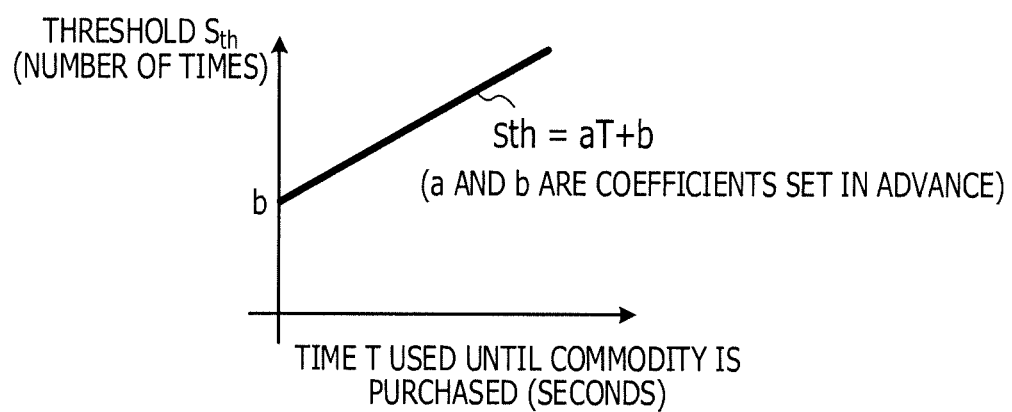
FIGS. 22A and 22B are diagrams illustrating one example of a method of deciding a threshold in the line-of-sight analysis processing according to the sixth embodiment.

Moreover, the threshold used at Step S88 in FIG. 20 may change in accordance with the number of object commodities (looked commodity) N, as one example being illustrated in FIGS. 22A and 22B. In the example of FIG. 22A, thresholds Sth2 to Sth5 are set to different values when the number of commodities is 2 to 5. In this setting, the smaller the number of commodities is, the higher the threshold is, thereby obtaining Sth2>Sth3>Sth4>Sth5.

In the example of FIG. 22B, a threshold Sth is set from the expression of Sth=aT+b depending on the time T used until the commodity is purchased. In this setting, a and b are coefficients set in advance. Further, the expression for obtaining the threshold Sth is not limited to the primary straight line. Noted that in the examples of FIGS. 22A and 22B, the threshold is indicated as the number of times, however, when the total looked time of the commodity is measured instead of the number of looked times of the commodity, the threshold may be indicated as the looked time or the looked frequency.

Noted that when n is set to a value indicating the purchase object commodity, the processes at Steps S88 to S96 may be skipped.

Seventh Embodiment

[Line-of-Sight Analysis Processing]

Figure 23A:
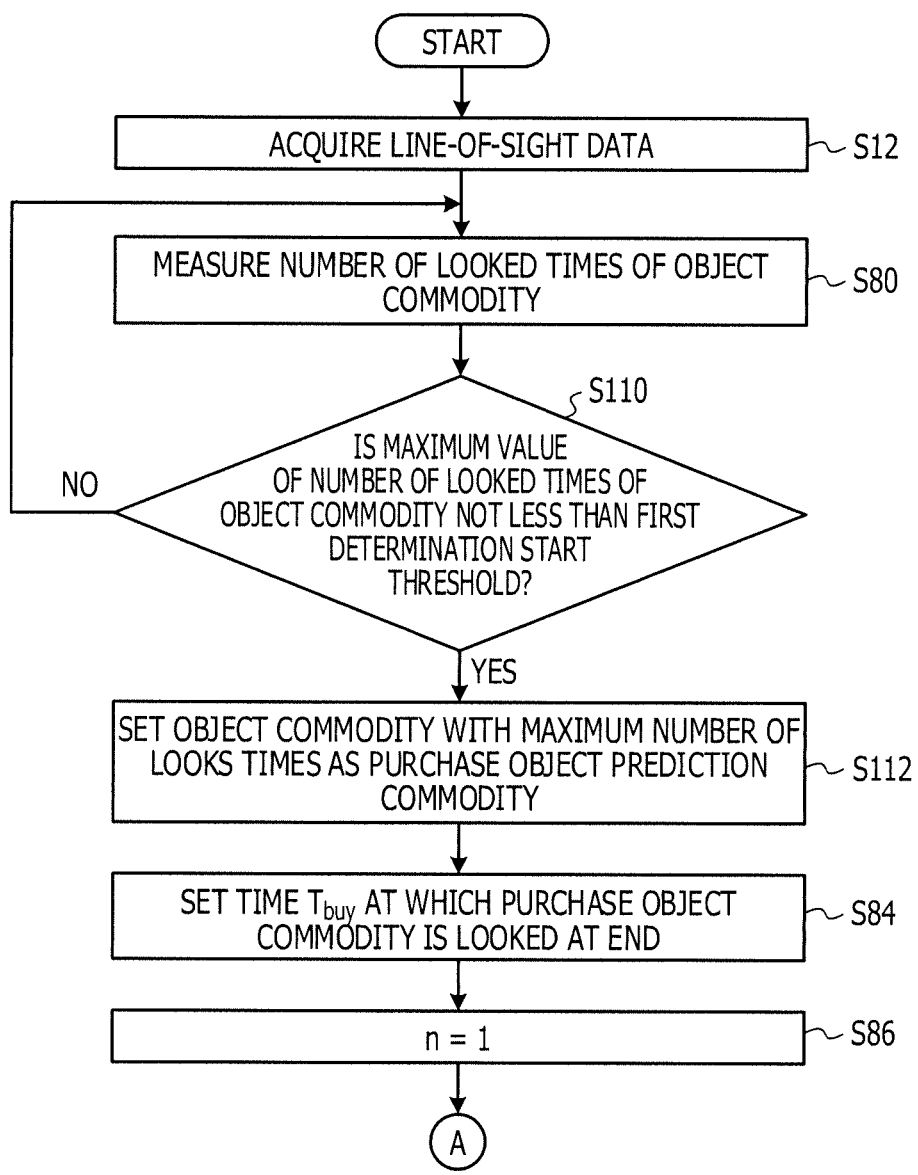
FIGS. 23A and 23B are flowcharts illustrating one example of line-of-sight analysis processing according to the seventh embodiment.
Figure 23B:
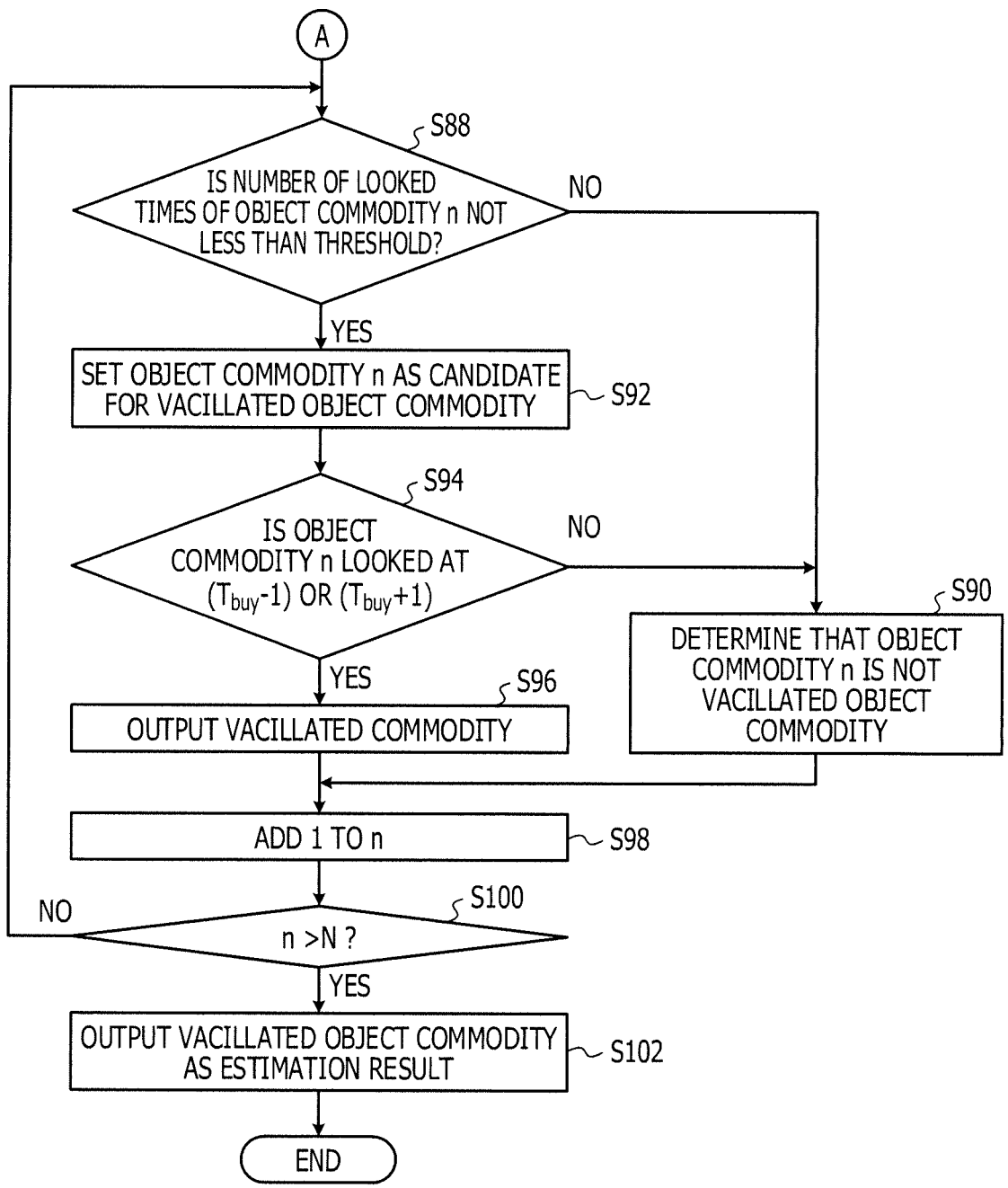
Figure 24:
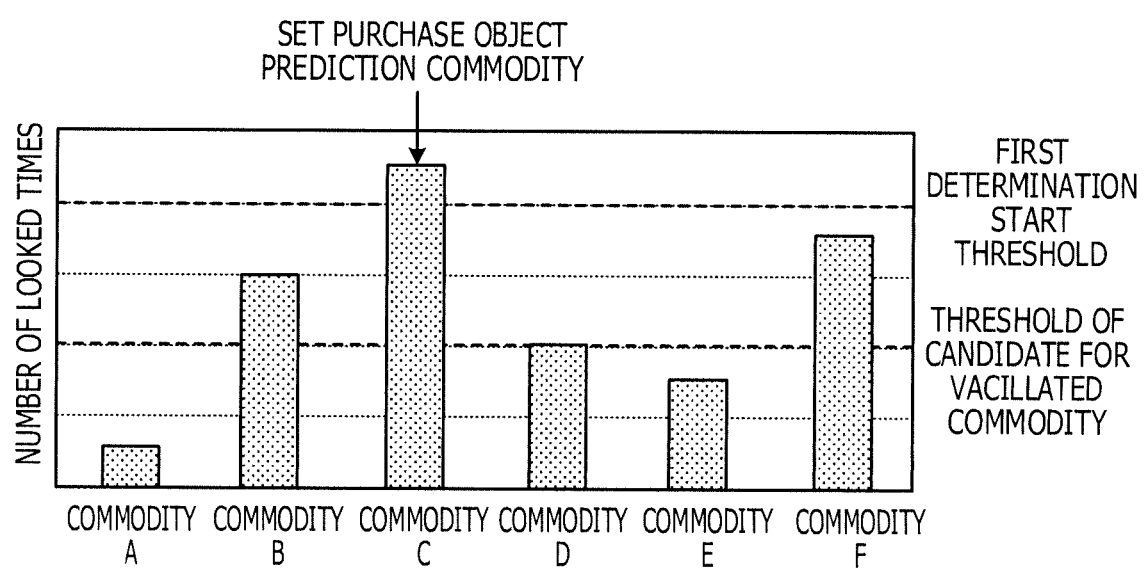
FIG. 24 is a diagram for explaining the line-of-sight analysis processing according to the seventh embodiment.

Next, one example of line-of-sight analysis processing according to the seventh embodiment is described with reference to FIGS. 23A and 23B, and FIG. 24. FIGS. 23A and 23B are flowcharts illustrating one example of the line-of-sight analysis processing according to the seventh embodiment. FIG. 24 is a diagram for explaining the line-of-sight analysis processing according to the seventh embodiment.

In the sixth embodiment, for example, the time when a commodity is actually purchased is used as a detection time of a selection event, and as a trigger of a start of the determination process (Steps S88 to S100 in FIG. 20) of the vacillated commodity.

In contrast, in the line-of-sight analysis processing according to the seventh embodiment, when the number of detections of the line-of-sight to any one of a plurality of object commodities for each unit time is not less than a first determination start threshold, and even when the commodity is not actually purchased, the commodity in which the number of detections of the line-of-sight is not less than the first determination start threshold is predicted as a purchase object commodity. The predicted purchase object commodity is also referred to as a purchase object prediction commodity. Further, the time when the number of detections of the line-of-sight to any one of a plurality of object commodities for each unit time is not less than the first determination start threshold is used as the detection time of the selection prediction event, and is used as a trigger of a start of a determination process of a vacillated commodity. In the following explanation, portions different from the sixth embodiment are described.

When this processing is started, the acquisition unit 13 executes the process at Step S12, the determination unit 14 determines a "looked commodity", from coordinates of the acquired line-of-sight data, based on each commodity region, and the calculation unit 15 measures the number of looked times for each object commodity (Step S80).

The determination unit 14 then determines whether out of object commodities, the maximum value of the number of looked times of the object commodity is not less than a first determination start threshold (Step S110). FIG. 24 illustrates one example of the first determination start threshold. In the example of FIG. 24, the first determination start threshold has a value more than a threshold for extracting a candidate for the vacillated commodity. If the determination unit 14 determines that out of object commodities, no commodity in which the maximum value of the number of looked times is not less than the first determination start threshold is present, the determination unit 14 repeats Steps S80 and S110. If the determination unit 14 determines that the maximum value of the number of looked times is not less than the first determination start threshold, the determination unit 14 causes the processing to proceed to Step S112. Noted that the case where the determination unit 14 determines that the maximum value of the number of looked times is not less than the first determination start threshold at Step S110 is one example of a case where a selection prediction event is detected.

At Step S112, the identification unit 16 sets the commodity in which the maximum value of the number of looked times is not less than the first determination start threshold as a commodity to be purchased with the highest possibility (purchase object prediction commodity), and causes the processing to proceed to Step S84.

The processes from Steps S84 to S102 are the same as the processes at Steps of the same numbers in the sixth embodiment, and thus the explanation is omitted.

As a result of this process, the commodity C is set as a purchase object prediction commodity in the example of FIG. 24. Further, out of the commodity B and the commodity F that are candidates for the vacillated commodity, a commodity that is looked at at least either time immediately before or immediately after the time when the selection prediction event is detected is identified as a vacillated commodity.

According to this, a commodity with the maximum number of looked times is set as a purchase object prediction commodity. The purchase object prediction commodity is one example of the first object. In other words, the purchase object prediction commodity as a commodity with the highest purchase willingness is treated similar to the purchase object commodity, so that a vacillated commodity may be identified in the real time during measurement of line-of-sight data. This enables information related to the identified vacillated commodity to be recommended to the user at the timing before the commodity is purchased.

Noted that instead of the time when the number of detections of the line-of-sight of any one of a plurality of object commodities for each unit time is not less than the first determination start threshold, the time when any one of a plurality of object commodities for each unit time is not less than a threshold instead of the first determination start threshold or the time when the total time of the line-of-sight for each unit time is not less than a threshold instead of the first determination start threshold may be used as the time at which the selection prediction event is detected.

Line-of-Sight Analysis Processing

Figure 25A:
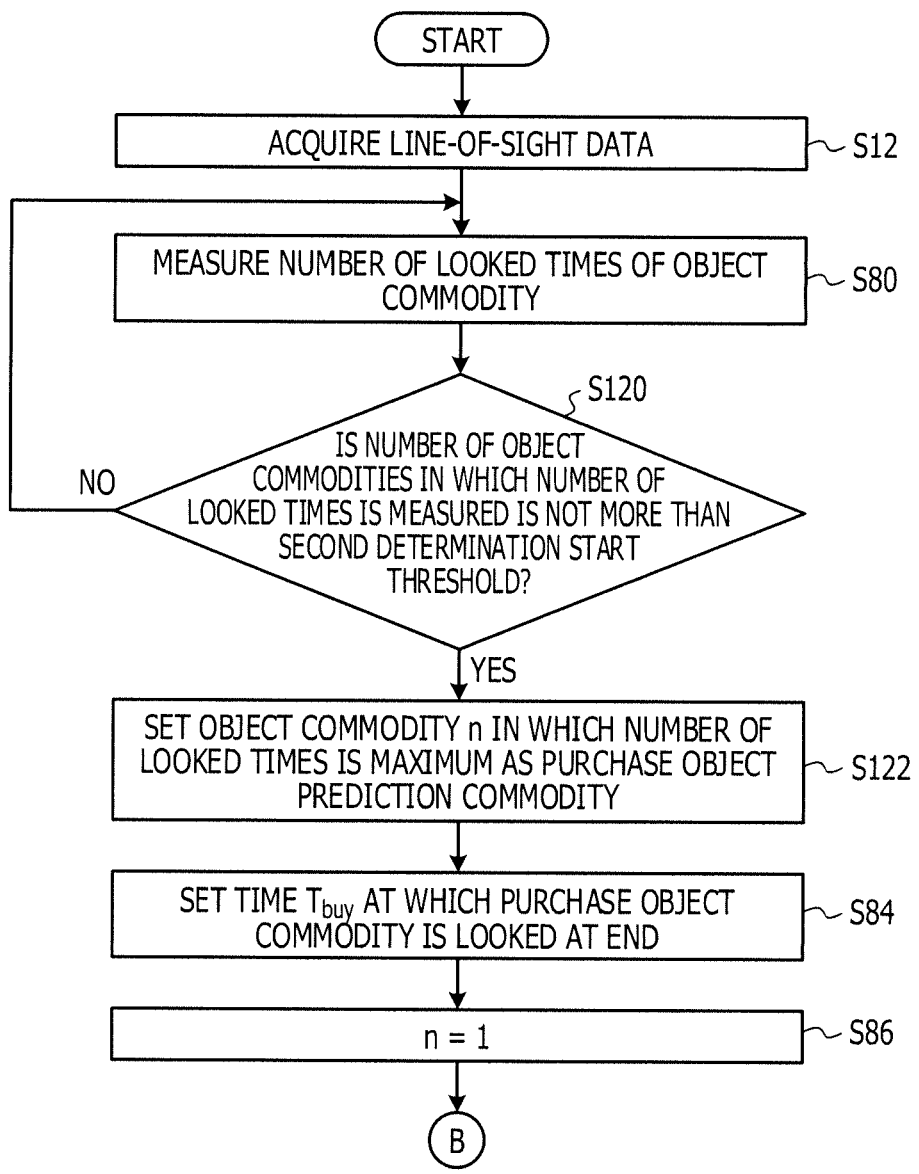
FIGS. 25A and 25B are flowcharts illustrating one example of line-of-sight analysis processing according to the eighth embodiment.
Figure 25B:
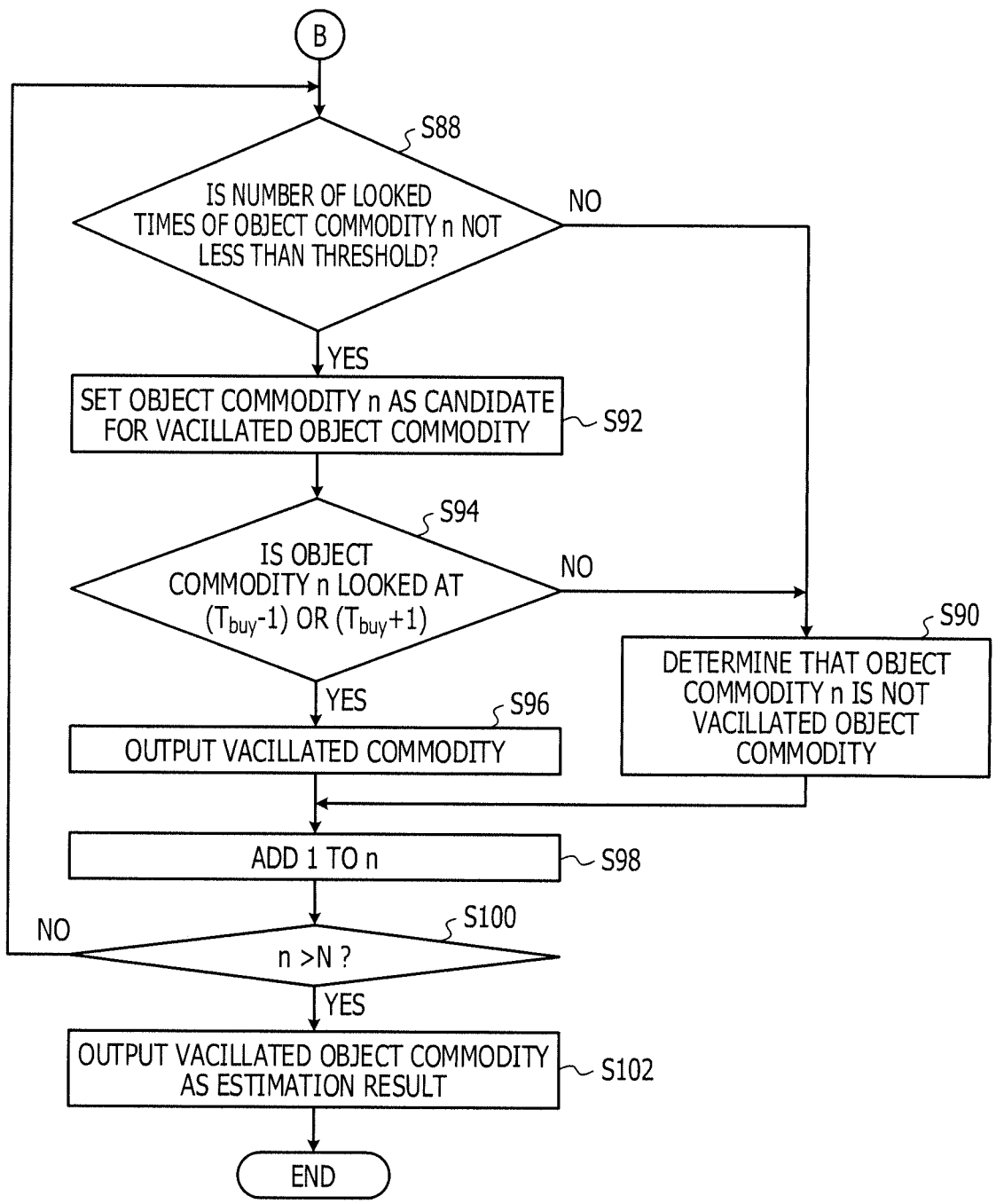
Figures 26A, 26B:
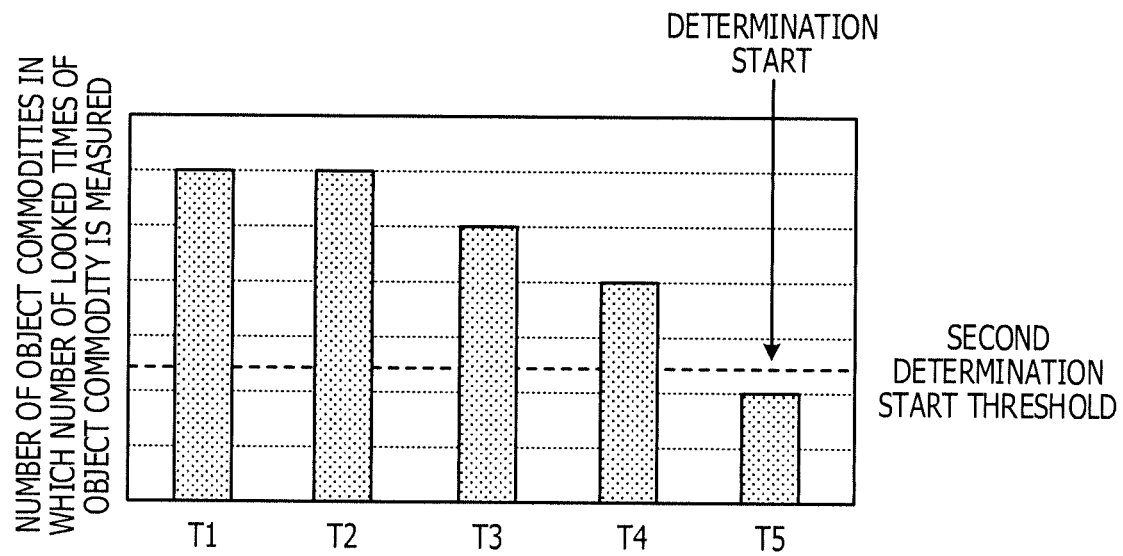
FIGS. 26A and 26B are diagrams for explaining the line-of-sight analysis processing according to the eighth embodiment.

Next, one example of line-of-sight analysis processing according to a eighth embodiment is described with reference to FIGS. 25A and 25B, and FIGS. 26A and 26B. FIGS. 25A and 25B (hereinafter, comprehensively referred to as "FIG. 25") are flowcharts illustrating one example of the line-of-sight analysis processing according to the eighth embodiment. FIGS. 26A and 26B are diagrams for explaining the line-of-sight analysis processing according to the eighth embodiment.

In the line-of-sight analysis processing according to the seventh embodiment, when the number of detections of the line-of-sight of any one of a plurality of object commodities for each unit time is not less than a first determination start threshold, and even when the commodity is not actually purchased, the commodity in which the number of detections of the line-of-sight is not less than the first determination start threshold is set as a purchase object prediction commodity. Further, this setting time is set as the time at which the selection prediction event is detected, and is used as a trigger of a start of a determination process of a vacillated commodity.

In contrast, in the eighth embodiment, out of a plurality of object commodities, the time when the number of object commodities in which the number of detections of the line-of-sight for each unit time is not less than the predetermined number of times (in the present embodiment, the predetermined number of times is 0, in other words, the number of object commodities in which the number of looked times is measured) is not more than a second determination start threshold is used as the time at which the selection prediction event is detected, and is used as a trigger of a start of a determination process of a vacillated commodity. In the following explanation, portions different from the seventh embodiment are described.

When this processing is started, the acquisition unit 13 executes the process at Step S12, the determination unit 14 determines a "looked commodity", from coordinates of the acquired line-of-sight data, based on each commodity region, and the calculation unit 15 measures the number of looked times for each object commodity (Step S80).

The determination unit 14 then determines, out of object commodities, whether the number of object commodities in which the number of looked times is measured is not more than a second determination start threshold (Step S120). FIG. 26A illustrates one example of the second determination start threshold.

While the determination unit 14 determines that the number of object commodities in which the number of looked times of the object commodity is measured is more than the second determination start threshold, the determination unit 14 repeats the processes at Steps S80 and S120. On the other hand, if the determination unit 14 determines that the number of object commodities in which the number of looked times of the object commodity is measured is not more than a second determination start threshold, the determination unit 14 causes the processing to proceed to Step S122. Noted that the case where the number of object commodities in which the number of looked times of the object commodity is measured is not more than the second determination start threshold at Step S120 is one example of a case where a selection prediction event is detected. Moreover, FIG. 26B illustrates one example of unit times T1 to T5.

At Step S122 in FIG. 25, the identification unit 16 sets an object commodity in which the number of looked times is the maximum as a commodity to be purchased with the highest possibility (purchase object prediction commodity), and causes the processing to proceed to Step S84.

The processes from Steps S84 to S102 are the same as the processes at Steps of the same numbers in the seventh embodiment, and thus the explanation is omitted.

Accordingly, a commodity with the maximum number of looked times is set as a purchase object prediction commodity. In other words, the purchase object prediction commodity as a commodity with the highest purchase willingness is treated similar to the purchase object commodity, so that a vacillated commodity may be identified in the real time during measurement of line-of-sight data. This enables information related to the identified vacillated commodity to be recommended to the user at the timing before the commodity is purchased.

Noted that instead of the time when the number of object commodities in which the number of looked times of the object commodity for the unit time is measured is not more than a second determination start threshold, the number of objects in each of which the time when the total time, the detection frequency, or the number of detections of the line-of-sight for the unit time is not more than a predetermined time, a predetermined frequency, or a predetermined number of times, is not more than a second determination start threshold may be used as the time at which the selection prediction event is detected.

In the line-of-sight analysis processing according to the sixth to eighth embodiments and the first to fifth embodiments described in the foregoing, as an event that serves as a trigger of a start of line-of-sight measurement, the time when a user comes in front of a shelf or a signage on which the line-of-sight sensor 22 is installed, and a face (or line-of-sight) is detected may be used. Moreover, the time when it is determined that the user stops in front of the commodity shelf based on a position detection of a body or skeleton using a camera image, a 3D sensor, or the like may be used. Moreover, the time when it is determined that the user stops in front of the commodity shelf based on a detection of the user position using Wi-Fi or GPS in a mobile terminal may be used.

Moreover, as an event that serves as a trigger of an end of the line-of-sight measurement, the time when the user has left from the front of the shelf or the signage on which the line-of-sight sensor 22 is installed, and the face (or line-of-sight) is not detected for a predetermined period of time may be used. Moreover, the time when it is determined that the user has left from the front of the commodity shelf based on a position detection of a body or skeleton using the camera image, the 3D sensor, or the like may be used. Moreover, the time when the vacillated commodity is identified by a real-time analysis of line-of-sight data may be used. Moreover, the time when the user presses down a purchase button on the signage or the like may be used. Moreover, the time when the measurement time set in advance of line-of-sight data is elapsed may be used.

The abovementioned line-of-sight analysis processing according to the first to the eighth embodiments may be used as follows alone or in combination therewith. For example, in the scene where the user looks at and selects commodities in the display showcase, information on a vacillated commodity by being compared with a purchased commodity is accumulated, thereby allowing the information to be used for the commodity development such as a package design based on the characteristics of commodities compared with a house product.

Moreover, in the scene where the user looks at and selects commodities displayed on the digital signage 20, when a client performs a touch operation to purchase a commodity, recommendation (additional information, coupon information) with respect to a vacillated commodity being compared with a purchase object commodity, thereby allowing the purchase to be prompted to the client.

In either the scene where the user looks at and selects commodities in the showcase or the scene where the user looks at and selects commodities displayed on the digital signage 20, the timing of the analysis may be after the commodity purchase or may be performed in the real time during a vacillation time period before the commodity purchase.

As in the foregoing, the line-of-sight analysis program, the line-of-sight analysis method, and the line-of-sight analysis apparatus have been described with the abovementioned embodiments, however, the line-of-sight analysis program, the line-of-sight analysis method, and the line-of-sight analysis apparatus according the disclosure are not limited to the abovementioned embodiments, and various modifications and improvements are possible without departing from the spirit and scope of the disclosure. Moreover, the plurality of the embodiments and modification examples may be used in combination therewith within a range where no contradiction occurs.

For example, in the respective embodiments, a vacillated commodity is identified based on the number of looked times of the commodity. However, the disclosure is not limited to this, and a vacillated commodity may be identified based on the total looked time of the commodity, for example.

Moreover, in the respective embodiments, the time T used for the commodity selection is trisected, and the number of times of the line-of-sight is calculated in each divided elapsed time. However, the disclosure is not limited to this, and the time T used for the commodity selection is divided into n, and the number of times of the line-of-sight may be calculated in the n-divided each elapsed time, for example. The number 2 or more may be used for n.

In the abovementioned embodiments, when a selection event indicating a selection of a commodity (purchase) is detected due to a selection button 24 being pressed down and the like, a vacillated commodity is identified based on a detection status of line-of-sight to a plurality of commodities in the most recent time period of the selection event. In this process, the most recent time period may be a time period within a predetermined time back from the detection of the selection event, or out of divided periods obtained by dividing a period T used for a selection of an object from a detection start of line-of-sight to the detection of the selection event into a plurality of periods, a divided period relatively close to the selection event.

Moreover, the vacillated object may be an object in which an increase in the detection frequency or the number of detections of the line-of-sight is detected within the most recent time period, with respect to the detection frequency or the number of detections of the line-of-sight in a predetermined period or in a divided period relatively close to the detection start of the line-of-sight out of the divided periods.

Moreover, for example, the configuration of the line-of-sight analysis apparatus 10 according to each embodiment is one example, which does not limit the range of the disclosure, and various configuration examples may be used in accordance with usage purposes or objects. For example, a part of the function of the line-of-sight analysis apparatus according to the disclosure may be conducted in an information processing apparatus coupled to a network or various kinds of processors on a cloud.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium for storing a line-of-sight analysis program, the line-of-sight analysis program causing a processor to execute a process, the process comprising:
    obtaining a selection event detected in a buying behavior of a user, the selection event indicating that the user has selected a first object out of a plurality of objects;
    identifying, in response to the obtained selection event, a second object different from the first object, based on a detection status of line-of-sight relative to the plurality of objects in a most recent time period, the most recent time period being a time period in the buying behavior of the user and immediately before the obtaining of the selection event; and
    outputting information indicating the identified second object.

2. The non-transitory computer-readable storage medium according to claim 1, wherein
    the second object identified by the identifying process is an object in which a detection frequency or the number of detections of the line-of-sight detected in the most recent time period is relatively large.

3. The non-transitory computer-readable storage medium according to claim 1, wherein
    the second object identified by the identifying process is an object in which the detection frequency or the number of detections of the line-of-sight detected in the most recent time period is equivalent to that of the first object.

4. The non-transitory computer-readable storage medium according to claim 1, wherein
    the most recent time period is a time period within a predetermined time back from the detection of the selection event, or a divided period relatively close to the selection event, the divided period being a part of divided periods obtained by dividing a period from a detection start of the line-of-sight to the detection of the selection event into a plurality of periods.

5. The non-transitory computer-readable storage medium according to claim 1, wherein
    the second object is an object in which an increase in the detection frequency or the number of detections of the line-of-sight is detected within the most recent time period, with respect to the detection frequency or the number of detections of the line-of-sight in a given time period, the given time period being a predetermined period from the detection start of the line-of-sight or a divided period relatively close to the detection start of the line-of-sight out of the divided periods.

6. The non-transitory computer-readable storage medium according to claim 1, the process further comprising:
    determining whether a selection of a commodity is vacillated based on a detection status of line-of-sight to a plurality of objects for each unit time, from a difference between a detection frequency or the number of detections of the line-of-sight in a first unit time and a detection frequency or the number of detections of the line-of-sight in a second unit time immediately after the first unit time.

7. The non-transitory computer-readable storage medium according to claim 1, wherein
    the identifying a second object includes:
    extracting, based on the detection status of the line-of-sight to the objects, an object in which a detection frequency or the number of detections of the line-of-sight relative to the objects for each predetermined time is relatively large, as a candidate for an object; and
    identifying, when a selection event or a selection prediction event with respect to the first object out of the objects is detected, at least one of the second objects which is different from the first object out of candidates for the object, based on the detection status of the line-of-sight to the candidates for the object in at least either one of a time before and a time after the time when the selection event or the selection prediction event is detected.

8. The non-transitory computer-readable storage medium according to claim 7, wherein
    the identifying at least one of the second objects includes identifying at least one of the second objects out of candidates for the object, based on the detection status of the line-of-sight to the candidates for the object in at least either one of a time immediately before and a time immediately after the time when the selection event or the selection prediction event is detected.

9. The non-transitory computer-readable storage medium according to claim 7, wherein
    the detecting a selection prediction event includes detecting a selection prediction event with respect to the first object, when either one of the detection frequency and the number of detections of the line-of-sight relative to the objects for each predetermined time is not less than a first determination start threshold.

10. The non-transitory computer-readable storage medium according to claim 7, wherein
    the detecting a selection prediction event includes detecting a selection prediction event with respect to the first object, when out of the objects, the number of objects in each of which the detection frequency or the number of detections of the line-of-sight for each predetermined time is not more than a predetermined frequency or a predetermined number of times is not more than a second determination start threshold.

11. A line-of-sight analysis method, performed by a computer, comprising:
    obtaining a selection event detected in a buying behavior of a user, the selection event indicating that the user has selected a first object out of a plurality of objects;
    identifying, in response to the obtained selection event, a second object different from the first object, based on a detection status of line-of-sight relative to the plurality of objects in a most recent time period, the most recent time period being a time period in the buying behavior of the user and immediately before the obtaining of the selection event; and outputting information indicating the identified second object.

12. A line-of-sight analysis apparatus comprising:

a memory; and a processor coupled to the memory and configured to
obtain a selection event detected in a buying behavior of a user, the selection event indicating that the user has selected a first object out of a plurality of objects;
identify, in response to the obtained selection event, a second object different from the first object, based on a detection status of line-of-sight relative to the plurality of objects in a most recent time period, the most recent time period being a time period in the buying behavior of the user and immediately before the obtaining of the selection event; and
output information indicating the identified second object.

* * * * *